US011170388B1

(12) United States Patent
Violette et al.

(10) Patent No.: US 11,170,388 B1
(45) Date of Patent: Nov. 9, 2021

(54) METHODS AND SYSTEMS FOR PROGRAMMATIC CONTROL OF TRANSMITTED ELECTRONIC CONTENT

(71) Applicant: Groupon, Inc., Chicago, IL (US)

(72) Inventors: James Violette, Issaquah, WA (US); Anthony Joseph, Bellevue, WA (US); Pip Courbois, Seattle, WA (US); Christopher Powers, Waukegan, IL (US)

(73) Assignee: Groupon, Inc., Chicago, IL (US)

( * ) Notice: Subject to any disclaimer, the term of this patent is extended or adjusted under 35 U.S.C. 154(b) by 440 days.

(21) Appl. No.: 15/167,108

(22) Filed: May 27, 2016

Related U.S. Application Data

(60) Provisional application No. 62/167,431, filed on May 28, 2015.

(51) Int. Cl.
*G06Q 30/02* (2012.01)
*H04L 12/26* (2006.01)

(52) U.S. Cl.
CPC ......... *G06Q 30/0201* (2013.01); *H04L 43/16* (2013.01)

(58) Field of Classification Search
None
See application file for complete search history.

(56) References Cited

U.S. PATENT DOCUMENTS

| 2007/0073553 A1* | 3/2007 | Flinn | G06Q 30/0283 705/1.1 |
| 2010/0100419 A1* | 4/2010 | Natoli | G06Q 30/02 705/7.31 |

(Continued)

FOREIGN PATENT DOCUMENTS

| CA | 2895438 A1 * | 12/2015 | ......... G06Q 30/0269 |

OTHER PUBLICATIONS

Dimitris Drossos et al., An Empirical Assessment of Factors that Influence the Effectiveness of SMS Advertising, 2007, Proceedings of the 40th Hawaii International Conference on System Sciences (Year: 2007).*
U.S. Appl. No. 62/098,987, filed Dec. 31, 2014, In re: Violette et al. entitled Methods and Systems for Managing Transmission of Electronic Marketing Communications, 79 pages.

(Continued)

*Primary Examiner* — Jerry O'Connor
*Assistant Examiner* — Matthew H Divelbiss
(74) *Attorney, Agent, or Firm* — Alston & Bird LLP

(57) ABSTRACT

Aspects of the invention provide methods, systems, apparatuses and computer program products for implementing a dynamic experimentation service. An example of a method for implementing a dynamic experimentation service includes receiving a set of experiment configuration parameters, determining, by a processor and based on the experiment configuration parameters, an experiment model, the experiment model comprising electronic data indicating an audience selected from a plurality of consumers and a plurality of levels for controlling a communication service in operation to generate an electronic marketing communication for transmission to at least one of the plurality of consumers, receiving a request, from the communication service, the request comprising a communication identifier, determining, based on the communication identifier, at least one of the plurality of levels, and causing the electronic marketing communication to be generated as a treatment comprising the at least one of the plurality of levels.

27 Claims, 10 Drawing Sheets

(56) References Cited

U.S. PATENT DOCUMENTS

| | | | |
|---|---|---|---|
| 2011/0258049 A1* | 10/2011 | Ramer | G06Q 30/0273 705/14.66 |
| 2014/0006139 A1 | 1/2014 | Aggarwal et al. | |
| 2014/0379428 A1* | 12/2014 | Phansalkar | G06Q 30/0202 705/7.32 |

OTHER PUBLICATIONS

U.S. Appl. No. 13/839,958, filed Mar. 15, 2013, In re: Aggarwal et al. entitled Inbox Management System, 51 pages.

U.S. Appl. No. 13/839,102, filed Mar. 15, 2013, In re: Trimble et al. entitled Customization of Message Delivery Time Based On Consumer Behavior, 52 pages.

U.S. Appl. No. 13/838,711, filed Mar. 15, 2013, In re: Aggarwal et al. entitled Cadence Management System for Consumer Promotions, 51 pages.

\* cited by examiner

METHODS AND SYSTEMS FOR PROGRAMMATIC CONTROL OF TRANSMITTED ELECTRONIC CONTENT

CROSS REFERENCES TO RELATED APPLICATIONS

This application claims priority to U.S. Provisional Patent Application No. 62/167,431, titled "METHODS AND SYSTEMS FOR PROGRAMMATIC CONTROL OF TRANSMITTED ELECTRONIC CONTENT" filed on May 28, 2015, the entirety of which is incorporated by reference.

TECHNOLOGICAL FIELD

Example embodiments of the present invention relate generally to transmitting electronic marketing communications and, more particularly, to methods, systems, and apparatuses for programmatically controlling the content of electronic marketing communications and the manner in which said electronic marketing communications are transmitted.

BACKGROUND

The applicant has discovered problems with current methods, systems, and apparatuses for evaluating and transmitting electronic marketing communications. Through applied effort, ingenuity, and innovation, Applicant has solved many of these identified problems by developing a solution that is embodied by the present invention, which is described in detail below.

BRIEF SUMMARY

Accordingly, a method, apparatus, and computer program manage the transmission of electronic marketing communications. Example embodiments may include methods, systems, apparatuses, and the like that provide for programmatic control of a variety of disparate services that, together, generate one or more electronic marketing communications. Embodiments may programmatically implement changes in content, transmission mechanisms, and other variables associated with generation and transmission of electronic marketing communications and track a variety of metrics associated with those electronic marketing communications. These metrics may be analyzed to determine the impact of particular settings and parameters on the performance of these electronic marketing communications. Embodiments may also assist with programmatic determination of experiment configuration parameters, including factor and level selection, and audience definition. Some embodiments may assist with dynamic selection and control of which users are exposed to particular experimental treatments to improve the quality of experimental results and to assist with further programmatic experiment definition.

Embodiments may include methods for implementing a dynamic experimentation service. An example method includes receiving a set of experiment configuration parameters, determining, by a processor and based on the experiment configuration parameters, an experiment model, the experiment model comprising electronic data indicating an audience selected from a plurality of consumers and a plurality of levels for controlling a communication service in operation to generate an electronic marketing communication for transmission to at least one of the plurality of consumers, receiving a request from the communication service, the request comprising a communication identifier, determining, based on the communication identifier, at least one of the plurality of levels, and causing the electronic marketing communication to be generated as a treatment comprising the at least one of the plurality of levels by transmitting the at least one of the plurality of levels to the communication service in response to receiving the request.

The communication identifier may identify a particular consumer recipient of the electronic marketing communication. The communication service may be at least one of a content selection service or a cadence management service. The method may include receiving clickstream data comprising a plurality of clickstream events, determining that at least one of the clickstream events is associated with the electronic marketing communication, and determining a performance characteristic of the at least one level used to generate the electronic marketing communication based at least in part on the at least one clickstream event. The method may include determining that a second of the clickstream events is associated with a different electronic marketing communication; and determining a second performance characteristic of a different level associated with the different electronic marketing communication. The at least one of the clickstream events may be determined to be associated with the electronic marketing communication based at least in part on the at least one clickstream event being associated with a consumer to which the electronic marketing communication was transmitted. The at least one of the clickstream events may be determined to be associated with the electronic marketing communication based at least in part on the at least one of the clickstream events occurring within a threshold time period of when the electronic marketing communication was transmitted. The threshold time period may be one week. The method may include providing an application programming interface by which the request is received from the communication service.

Embodiments also include apparatuses for implementing a dynamic experimentation service. An example apparatus includes means for receiving a set of experiment configuration parameters, means for determining based on the experiment configuration parameters, an experiment model, the experiment model comprising electronic data indicating an audience selected from a plurality of consumers and a plurality of levels for controlling a communication service in operation to generate an electronic marketing communication for transmission to at least one of the plurality of consumers, means for receiving a request, from the communication service, the request comprising a communication identifier, means for determining, based on the communication identifier, at least one of the plurality of levels, and means for causing the electronic marketing communication to be generated as a treatment comprising the at least one of the plurality of levels by transmitting the at least one of the plurality of levels to the communication service in response to receiving the request.

The communication identifier may identify a particular consumer recipient of the electronic marketing communication. The communication service may be at least one of a content selection service or a cadence management service. The apparatus may include means for receiving clickstream data comprising a plurality of clickstream events, means for determining that at least one of the clickstream events is associated with the electronic marketing communication, and means for determining a performance characteristic of the at least one level used to generate the electronic marketing communication based at least in part on the at least one clickstream event. The apparatus may also include means for determining that a second of the clickstream events is associated with a different electronic marketing communication, and means for determining a second performance characteristic of a different level associated with the different electronic marketing communication. The at least one of the clickstream events may be determined to be associated with the electronic marketing communication based at least in part on the at least one clickstream event being associated with a consumer to which the electronic marketing communication was transmitted. The at least one of the clickstream events may be determined to be associated with the electronic marketing communication based at least in part on the at least one of the clickstream events occurring within a threshold time period of when the electronic marketing communication was transmitted. The threshold time period may be one week. The apparatus may also include means for providing an application programming interface by which the request is received from the communication service.

Embodiments may also include a non-transitory computer-readable storage medium comprising instructions that, when executed by a processor, cause the processor to implement a dynamic experimentation framework. The instructions include program instructions that cause the processor to receive a set of experiment configuration parameters, determine, based on the experiment configuration parameters, an experiment model, the experiment model comprising electronic data indicating an audience selected from a plurality of consumers and a plurality of levels for controlling a communication service in operation to generate an electronic marketing communication for transmission to at least one of the plurality of consumers, receive a request, from the communication service, the request comprising a communication identifier, determine, based on the communication identifier, at least one of the plurality of levels, and cause the electronic marketing communication to be generated as a treatment comprising the at least one of the plurality of levels by transmitting the at least one of the plurality of levels to the communication service in response to receiving the request.

The communication identifier may identify a particular consumer recipient of the electronic marketing communication. The communication service may be at least one of a content selection service or a cadence management service. The instructions may also cause the processor to receive clickstream data comprising a plurality of clickstream events, determine that at least one of the clickstream events is associated with the electronic marketing communication, and determine a performance characteristic of the at least one level used to generate the electronic marketing communication based at least in part on the at least one clickstream event. The instructions may also cause the processor to determine that a second of the clickstream events is associated with a different electronic marketing communication, and determine a second performance characteristic of a different level associated with the different electronic marketing communication. The at least one of the clickstream events may be determined to be associated with the electronic marketing communication based at least in part on the at least one clickstream event being associated with a consumer to which the electronic marketing communication was transmitted. The at least one of the clickstream events may be determined to be associated with the electronic marketing communication based at least in part on the at least one of the clickstream events occurring within a threshold time period of when the electronic marketing communication was transmitted. The threshold time period may be one week. The instructions may further cause the processor to provide an application programming interface by which the request is received from the communication service.

Embodiments may also include yet another apparatus for implementing a dynamic experimentation service. The apparatus includes experiment configuration circuitry and experiment management circuitry. The experiment configuration circuitry is configured to receive a set of experiment configuration parameters, and to provide the set of experiment configuration parameters to experiment management circuitry. The experiment management circuitry is configured to determine, based on the experiment configuration parameters, an experiment model, the experiment model comprising electronic data indicating an audience selected from a plurality of consumers and a plurality of levels for controlling a communication service in operation to generate an electronic marketing communication for transmission to at least one of the plurality of consumers, receive a request from the communication service, the request comprising a communication identifier, determine, based on the communication identifier, at least one of the plurality of levels, and cause the electronic marketing communication to be generated as a treatment comprising the at least one of the plurality of levels by transmitting the at least one of the plurality of levels to the communication service in response to receiving the request. The communication identifier may identify a particular consumer recipient of the electronic marketing communication. The communication service may be at least one of a content selection service or a cadence management service.

The apparatus may also include result analysis circuitry. The result analysis circuitry may be configured to receive clickstream data comprising a plurality of clickstream events, determine that at least one of the clickstream events is associated with the electronic marketing communication, and determine a performance characteristic of the at least one level used to generate the electronic marketing communication based at least in part on the at least one clickstream event. The result analysis circuitry may be further configured to determine that a second of the clickstream events is associated with a different electronic marketing communication, and to determine a second performance characteristic of a different level associated with the different electronic marketing communication. The at least one of the clickstream events may be determined to be associated with the electronic marketing communication based at least in part on the at least one clickstream event being associated with a consumer to which the electronic marketing communication was transmitted. The at least one of the clickstream events may be determined to be associated with the electronic marketing communication based at least in part on the at least one of the clickstream events occurring within a threshold time period of when the electronic marketing communication was transmitted. The threshold time period may be one week. The experiment management circuitry may be further configured to provide an application programming interface by which the request is received from the communication service.

Embodiments also include a method for generating an electronic marketing communication in a system implementing a dynamic experimentation service. An example of the method includes notifying, by a communication service executing using a processor, an experimentation service of one or more levels with which the communication service is compatible, the one or more levels defining parameters for at least one of generating or transmitting an electronic marketing communication, determining, via the processor, a communication identifier for the electronic marketing communication, notifying the experimentation service of the communication identifier, receiving, in response to notifying the experimentation service of the communication identifier, at least one level selected from the one or more levels with which the communication service is compatible, the at least one level received from the experimentation service, and using, by the communication service, the received at least one level to at least one of generate or transmit the electronic marketing communication associated with the communication identifier. The communication identifier may be at least one of a consumer identifier or a unique identifier associated with the electronic marketing communication. The communication service may notify the experimentation service via an application programming interface. The communication service may be at least one of a content selection service or a cadence management service.

Embodiments also include an apparatus for generating an electronic marketing communication in a system implementing a dynamic experimentation service. The apparatus includes means for notifying, by a communication service executing using a processor, an experimentation service of one or more levels with which the communication service is compatible, the one or more levels defining parameters for at least one of generating or transmitting an electronic marketing communication, means for determining, via the processor, a communication identifier for the electronic marketing communication, means for notifying the experimentation service of the communication identifier, means for receiving, in response to notifying the experimentation service of the communication identifier, at least one level selected from the one or more levels with which the communication service is compatible, the at least one level received from the experimentation service, and means for using, by the communication service, the received at least one level to at least one of generate or transmit the electronic marketing communication associated with the communication identifier.

The communication identifier may be at least one of a consumer identifier or a unique identifier associated with the electronic marketing communication. The communication service may notify the experimentation service via an application programming interface. The communication service may be at least one of a content selection service or a cadence management service.

Embodiments also include a non-transitory computer readable storage medium comprising instructions that, when executed by a processor, cause the processor to generate an electronic marketing communication using a dynamic experimentation service. The instructions cause the processor to notify an experimentation service of one or more levels with which the communication service is compatible, the one or more levels defining parameters for at least one of generating or transmitting an electronic marketing communication, determine a communication identifier for the electronic marketing communication, notify the experimentation service of the communication identifier, receive, in response to notifying the experimentation service of the communication identifier, at least one level selected from the one or more levels with which the communication service is compatible, the at least one level received from the experimentation service, and use, by the communication service, the received at least one level to at least one of generate or transmit the electronic marketing communication associated with the communication identifier. The communication identifier may be at least one of a consumer identifier or a unique identifier associated with the electronic marketing communication. The communication service may notify the experimentation service via an application programming interface. The communication service may be at least one of a content selection service or a cadence management service.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
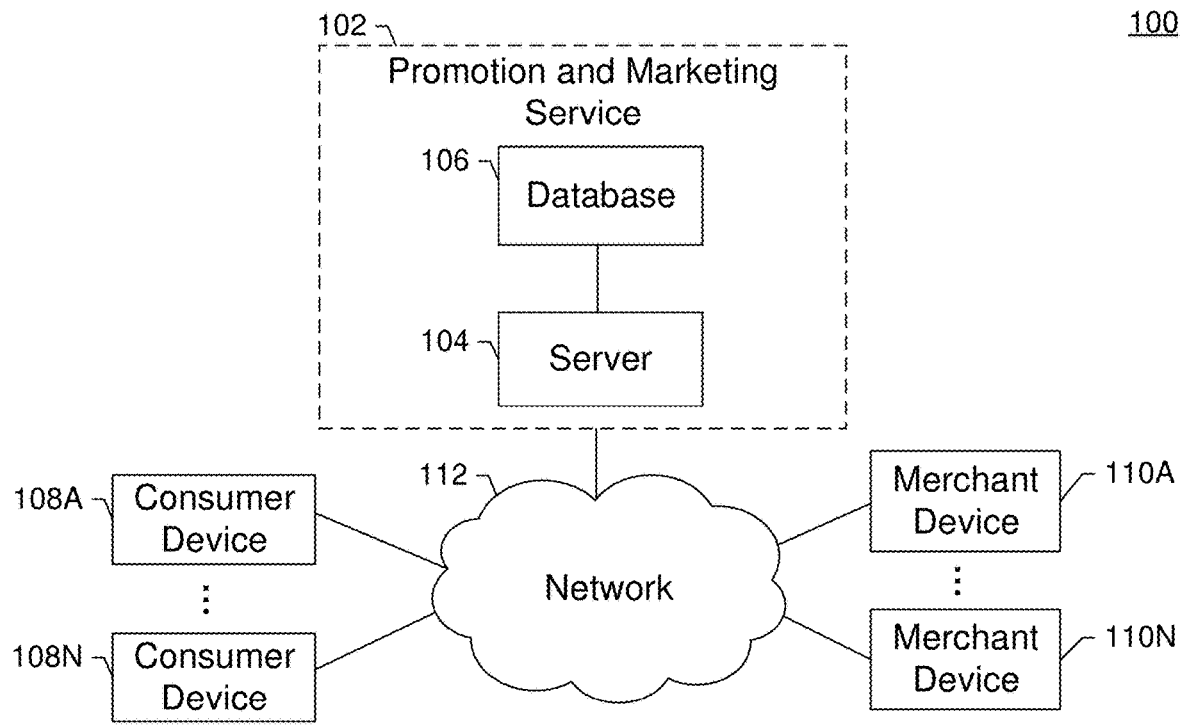
Figure 2:
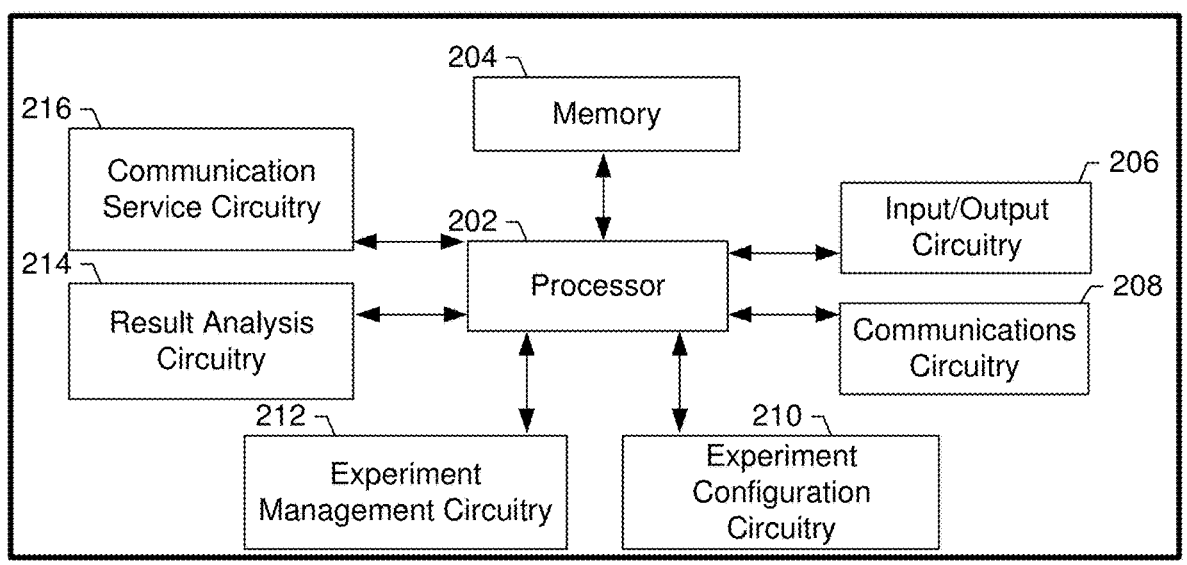
Figure 3:
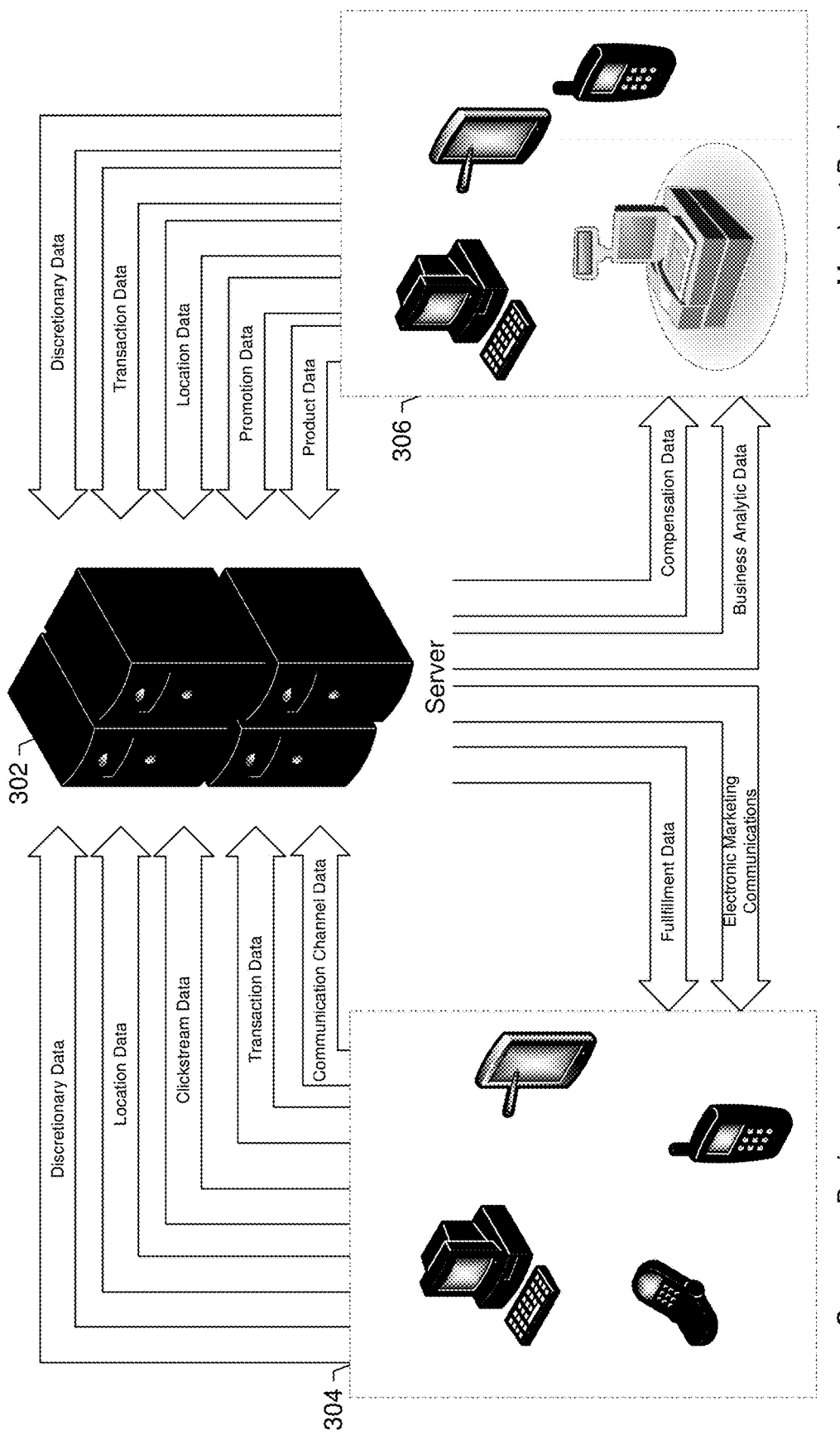
Figure 4:
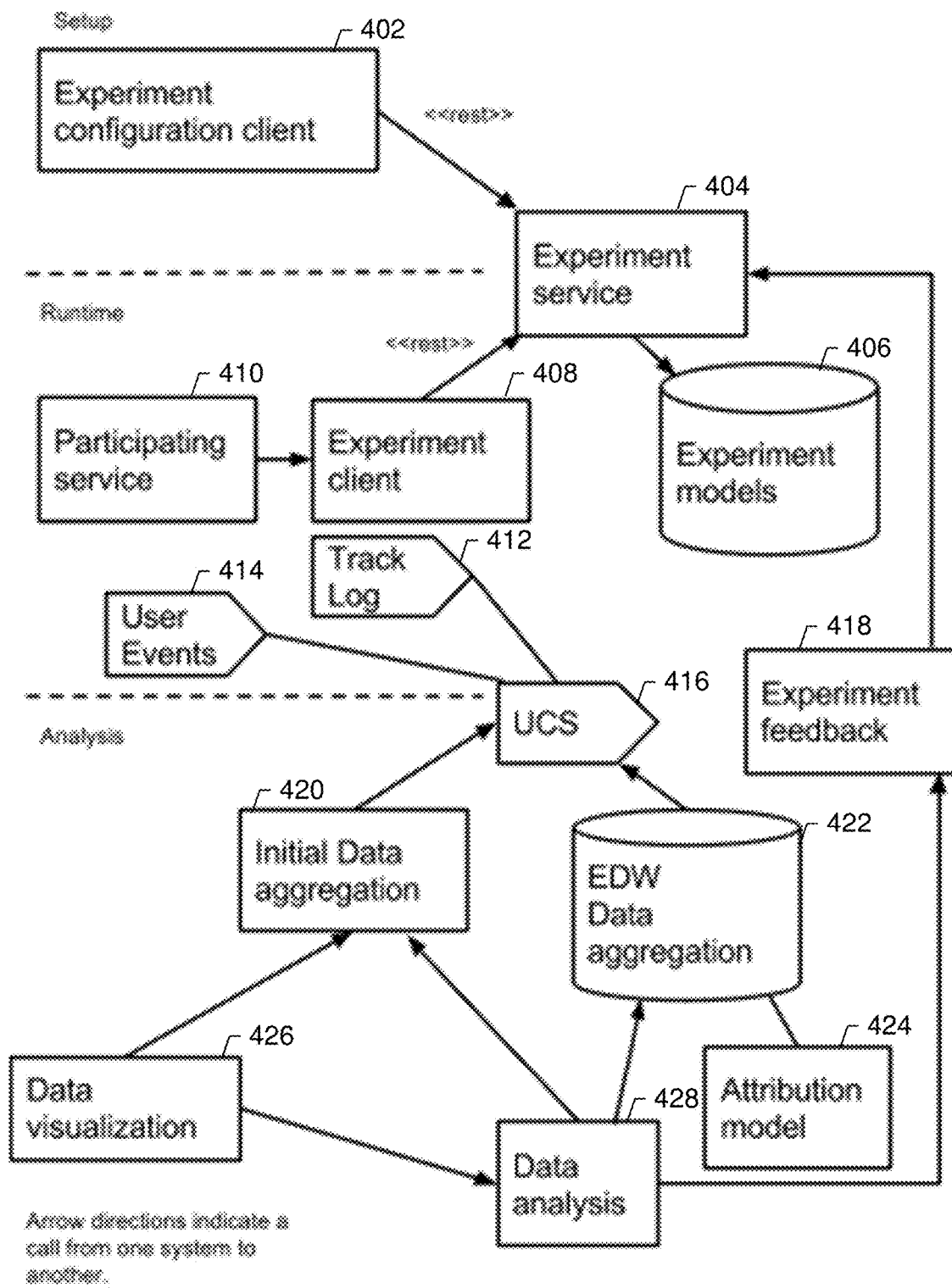
Figure 5:
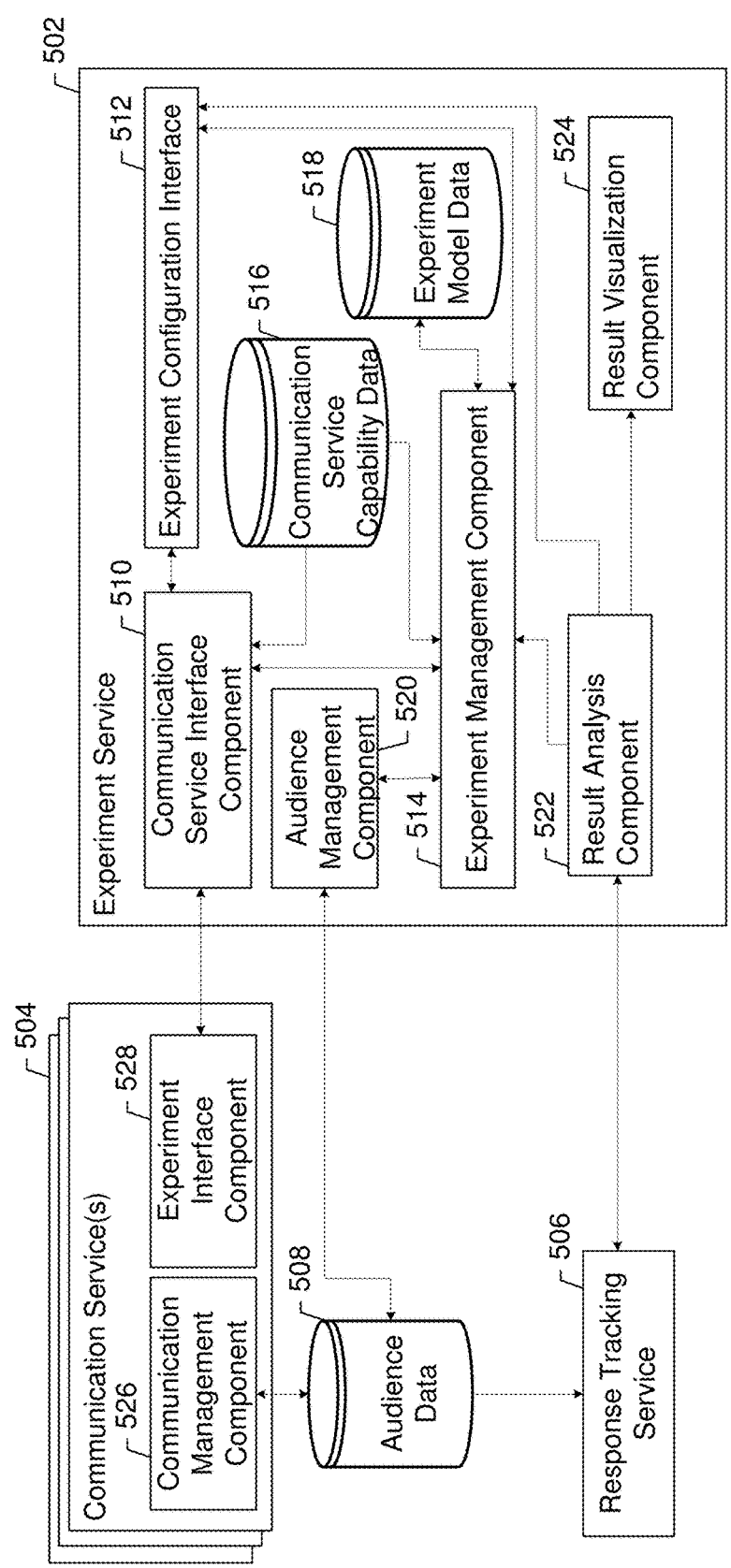
Figure 6:
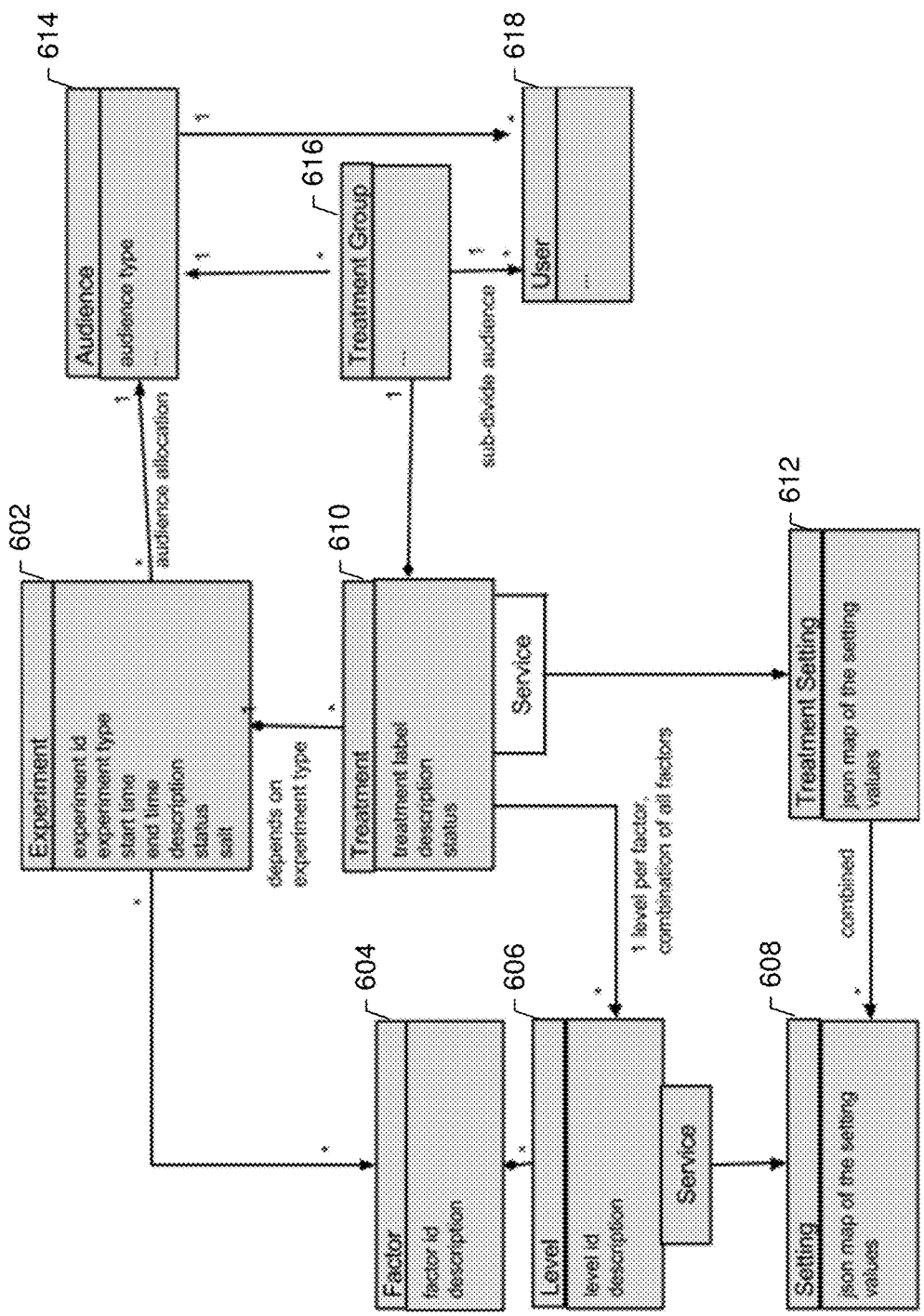
Figure 7:
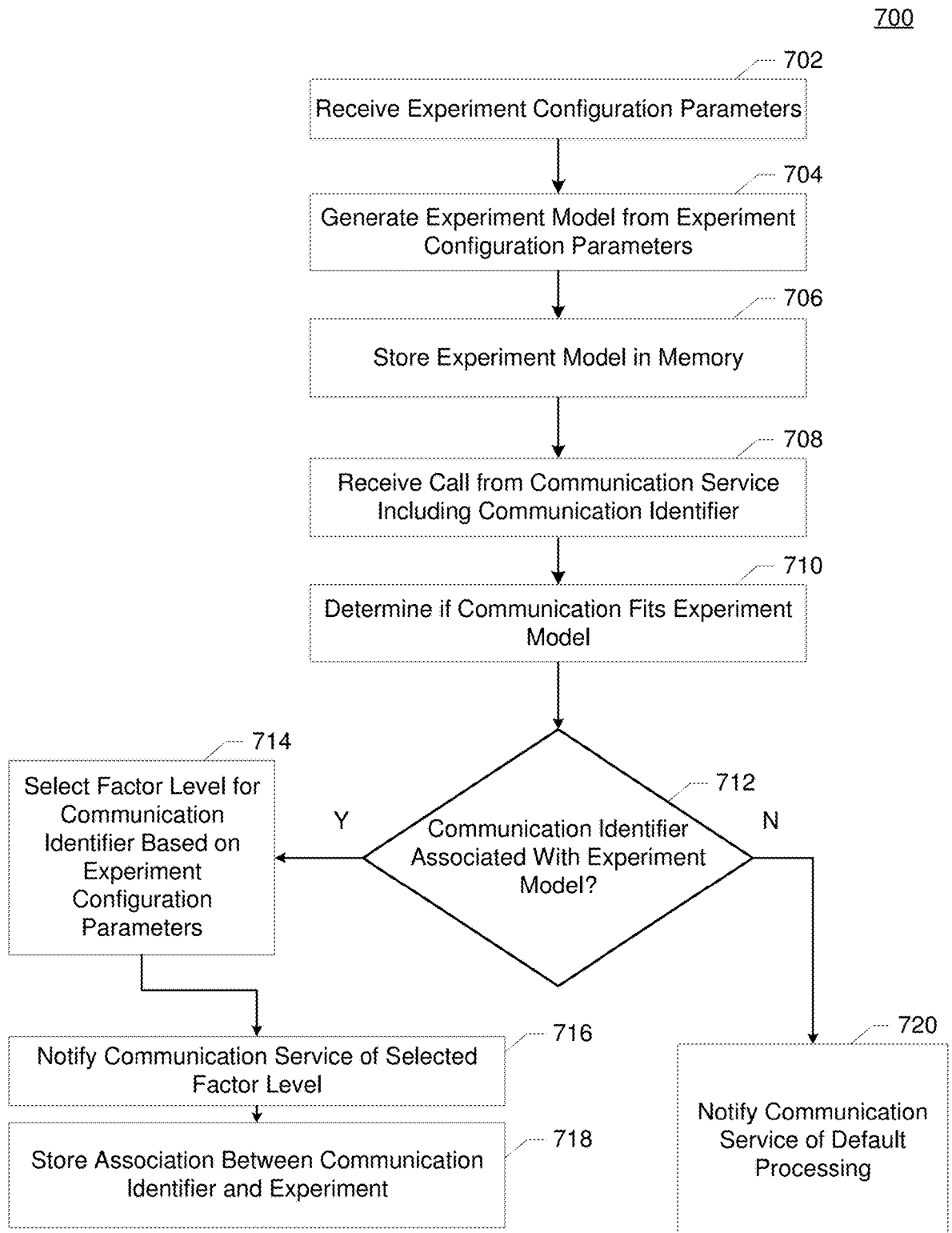
Figure 8:
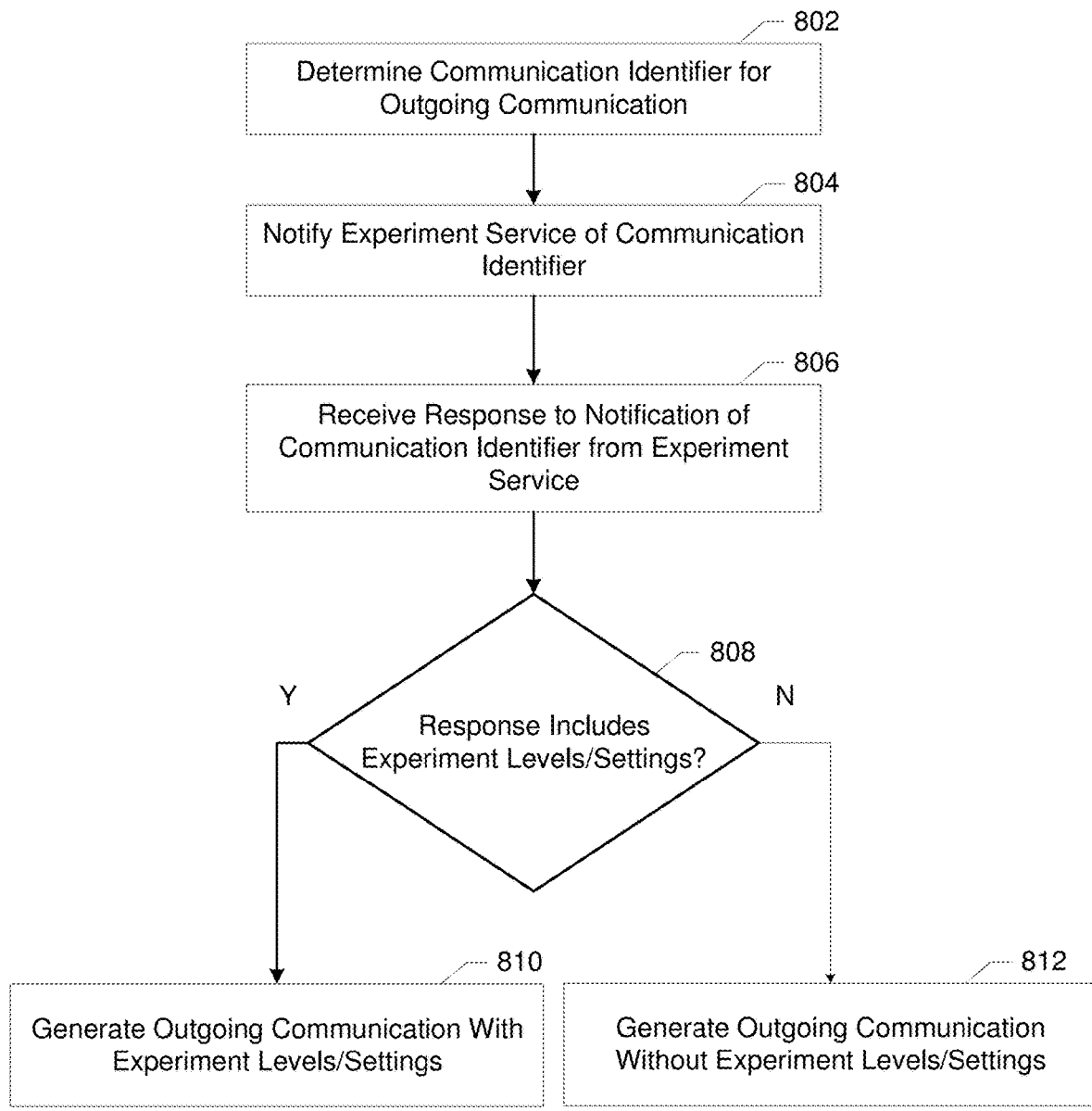
Figure 9:
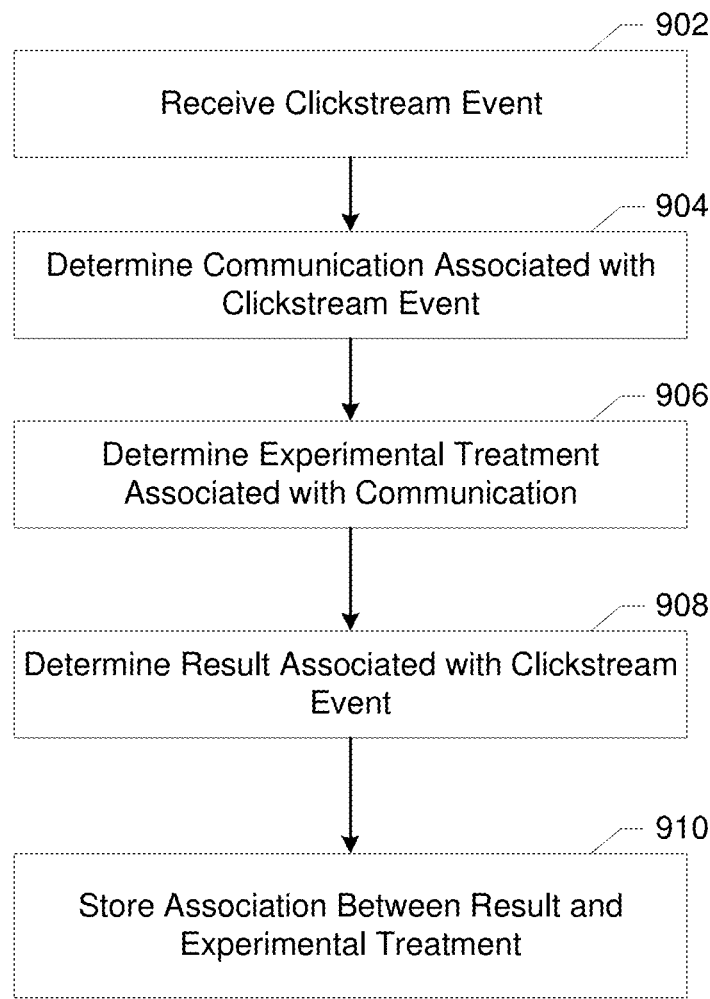
Figure 10:
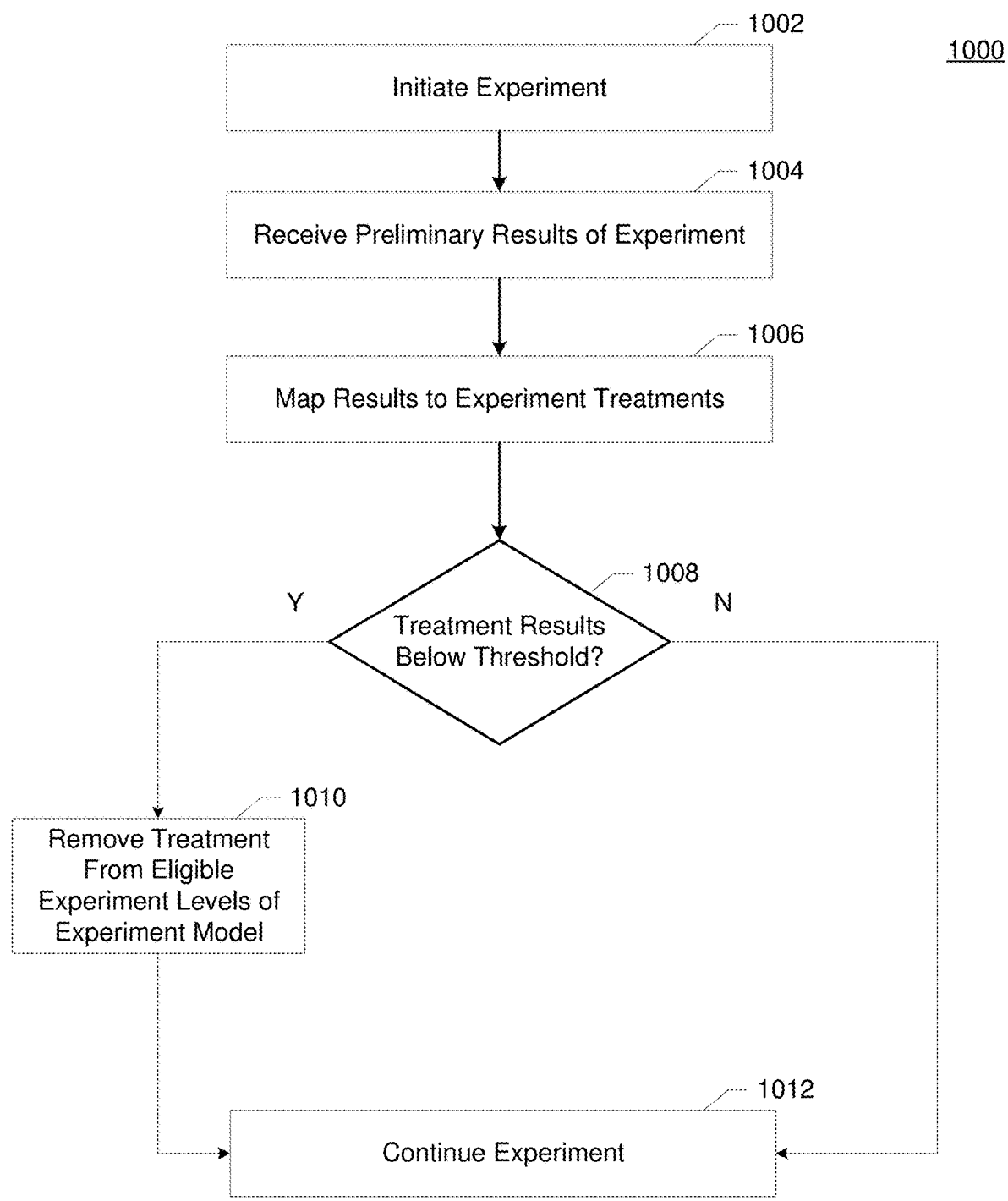
Figure 11:
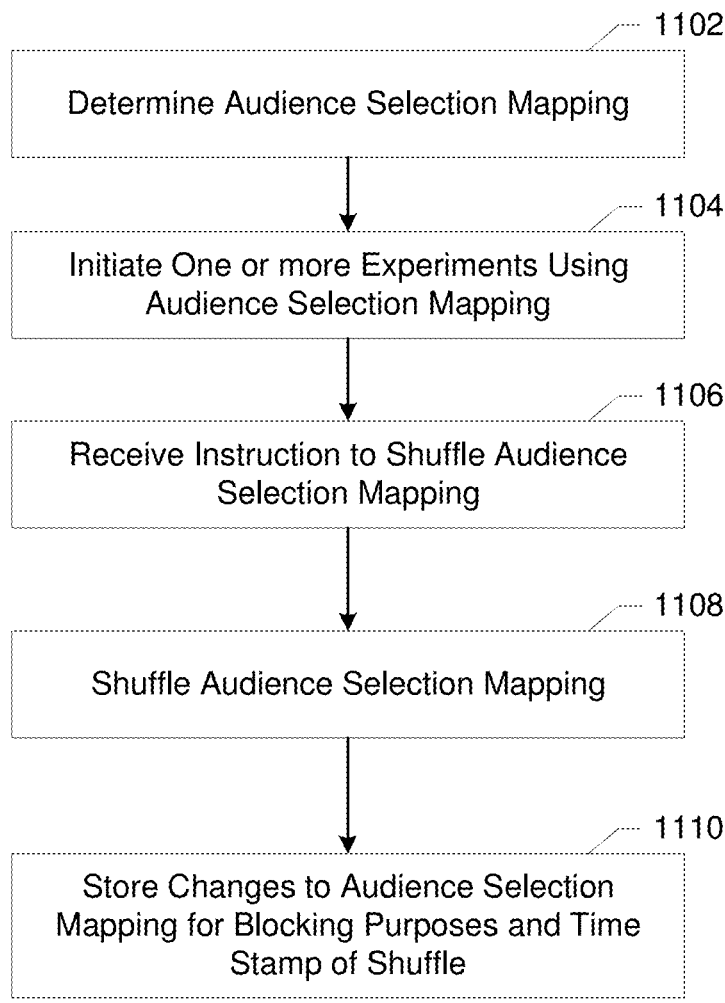

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a dynamic experimentation system using special-purpose circuitry in accordance with some exemplary embodiments of the present invention;

FIG. 3 illustrates an example data flow among a consumer device, a server, and a merchant device in accordance with some exemplary embodiments of the present invention;

FIG. 4 illustrates an example of a data flow depicting interactions between services in an exemplary system incorporating multiple services in interaction with an experiment service in accordance with some exemplary embodiments of the present invention;

FIG. 5 illustrates an example of a data flow interaction among components of an experimentation system implementing an experiment system in accordance with some exemplary embodiments of the present invention;

FIG. 6 illustrates an example of a domain model for an experiment as implemented by an exemplary experiment service in accordance with some exemplary embodiments of the present invention;

FIG. 7 illustrates a flow diagram depicting an example of a method for performing an experiment in accordance with some exemplary embodiments of the present invention;

FIG. 8 illustrates a flow diagram depicting an example of a method for altering outgoing electronic marketing communications by an experiment service in accordance with some exemplary embodiments of the present invention;

FIG. 9 illustrates a flow diagram depicting an example of a method for tracking results of an experiment in accordance with some exemplary embodiments of the present invention;

FIG. 10 illustrates a flow diagram depicting an example of a method for dynamically altering an experiment in real-time in accordance with some exemplary embodiments of the present invention; and FIG. 11 illustrates a flow diagram depicting an example of a method for performing audience mapping in accordance with some exemplary embodiments of the present invention.

DETAILED DESCRIPTION

Overview

Various embodiments of the present invention are directed to improved apparatuses, methods, and computer readable media for managing the content and transmission of electronic marketing communications to programmatically perform experiments, track results, and define new experiments to test the impact of alterations to electronic marketing communications in a manner that provides useful, robust analysis operating within a flexible framework that does not require tight coupling between an experiment management service and one or more communication services. In this regard, embodiments of the present invention provide systems, devices, and frameworks that enable communication among multiple services in a multi-service environment to manage the interactions between those services for the purpose of generating and transmitting electronic marketing communications. Embodiments include tools for defining the parameters of experiments, selecting experimental audiences, and configuring communication services to implement the experiments. Embodiments also provide for mapping of incoming data to particular experimental treatments for the purpose of determining the results of experiments. Embodiments provide for dynamic alteration of experimental parameters based on measured results, including definition of new experiments based on measured results. Embodiments further allow for audience tracking during and across experiments for use in blocking operations.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like. The term "clickstream event" should be understood to refer to a particular occurrence, event, or group of events as indicated in the clickstream data (e.g., an interaction with a web page, an access of a particular URL, or the like). Accordingly, a stream of clickstream data comprises a plurality of clickstream events.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the terms "electronic marketing communication" and "message" refer to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "communication service" refers to a particular application, module, algorithm, service, device, or the like that is capable of causing the generation of some portion of an electronic marketing communication or controlling or configuring the manner in which some portion of an electronic marketing communication is transmitted. Communication services may select content for the electronic marketing communication or message or merely send a signal instructing another module or service to generate or select content for the electronic marketing communication. Selection of content of an electronic marketing communication may include selecting particular products, promotions, or the like for inclusion in an electronic marketing communication, selecting particular non-promotion content (e.g., product shipping notifications, requests for additional discretionary data, user account status data), selecting particular formatting elements (e.g., number of columns, size of images, text font size), selecting other content generators for use in generating the electronic marketing communication (e.g., selection of other applications which in turn select content for the electronic marketing communication), selection of a title or subject of the electronic marketing communication, or the like. Communication services may also configure other aspects of the process of sending the electronic marketing communication, such as whether and when particular electronic marketing communications are sent (e.g., by controlling a cadence at which an outgoing electronic marketing communications is sent, or selecting a time of day at which the electronic marketing communications is sent), selecting which users receive which electronic marketing communications, selecting the type of electronic marketing communication (e.g., selecting one or more of an email, "push" notification, or SMS electronic marketing communication type), or the like.

The term "experiment" is intended to refer to an operation used to test the impact of one or more parameters used in the generation and/or transmission of electronic marketing communications. An experiment has an associated set of experiment configuration parameters. Experiments may be defined by those parameters or a stored in a data structure with a unique identifier associated with a group of parameters. Experiment configuration parameters may include a set of electronic data sufficient to define a particular experiment. These experiment configuration parameters may include, for example, definitions of the factors associated with the experiment, definitions of levels that are associated with the experiment, definitions of the audience for the experiment, naming conventions for the experiment and treatments generated by the experiment, and/or various configuration parameters for the experiment.

The term "factor" refers to a variable that may be affected by an experiment. Different communication services may be associated with different factors, and particular services may use different factors when participating in the process of generating an electronic marketing communication. For example, a service that controls a cadence at which emails are sent would be associated with an "email cadence" factor, while a service that selects promotion content for inclusion in an electronic marketing communication would be associated with a "promotion content" factor, and a service that selects an email subject for an outgoing email would be associated with an "email subject" factor. A factor may have a plurality of "levels" which define specific, mutually exclusive values for the factor. For example, using the factor examples enumerated above, the "email cadence" factor might have levels of "daily, every 4 hours, every 8 hours, weekly", the "promotion content" factor might have levels of "restaurant promotions, spa promotions, sporting good promotions, vacation getaways", and the "email subject" might have levels associated with particular text email subjects. An example of such a cadence management communication service is described more fully in U.S. Provisional Patent Application 62/098,987 and U.S. patent application Ser. Nos. 13/839,102, 13/839,958, 13/838,711, and 13/838,452, which are herein incorporated by reference in their entirety.

It should be appreciated that individual communication services may be associated with a plurality of factors, each with their own attendant levels. In some embodiments, levels may also have sub-levels (e.g., for a promotion content selection service, a "promotion content" factor might have a level of "vacation" with attendant sub-levels of "tropical," "historic," and "skiing"). It should be appreciated that selection of factors and levels as described herein necessarily includes electronic interfaces (e.g., networks, shared memories, application programming interfaces, or the like) to notify communication services, experiment services, and the like of factor selection, level selection, factor and level availability, and the like.

The term "treatment" is used to refer to a particular group of factors and levels used to generate an electronic marketing communication or group of electronic marketing communications that is/are generated and/or transmitted according to one or more factors as defined by an experiment. For example, if a given experiment is testing the suitability of a particular set of promotion content, electronic marketing communications sent to test that suitability (e.g., in the case of an A/B test, a variable group that receives the set of promotion content and a control group that does not receive the set of promotion content), each electronic marketing communication may represent a separate treatment as defined by the combination of factor levels used to generate the electronic marketing communication. In cases where the experiment is designed to test groupings of electronic marketing communications (e.g., where the experiment tests a performance of two types of electronic marketing communications sent back-to-back, such that factor levels are applied across multiple electronic marketing communications), the treatment would be each separate grouping of electronic marketing communications. It should be appreciated that in some embodiments a particular electronic marketing communication may also function as a treatment for multiple separate experiments, such as in cases where multiple experiments are running simultaneously. Accordingly, descriptions of a given electronic marketing communication or communications as a "treatment for" a given experiment imply that a the particular electronic marketing communication or communications is/are associated with that experiment such that consumer interactions with that electronic marketing communication(s) provide results for the experiment.

The term "audience" is understood to refer to a group of consumers or other users that are assigned to receive a treatment or treatments for a particular experiment. The audience may be selected from a larger group of users according to various techniques as described herein, and different audiences may be selected for different experiments. Individual users may be assigned to multiple audiences simultaneously.

The term "campaign" is understood to refer to a group of electronic marketing communications have a particular factor or factors in common. For example, a given campaign may utilize a particular subject line in an email or offer a particular type of discount. It should be appreciated that individual marketing communications may still have separate and distinct factors within a campaign. For example, a campaign that offers a discount percentage may be configured such that all electronic marketing communications offer a percentage discount, but the value of that percentage differs over the campaign (e.g., some electronic marketing communications offering a 10% discount, some a 20% discount, and others a 25% discount).

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions allows the promotion and marketing service to gather data related to the time, place, and manner in which the consumer engages with the impression (e.g., viewed, clicked, moused-over) and obtains and redeems the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

In particular, the ability to particularly target multiple aspects of an electronic marketing communication to a particular consumer or group of consumers has introduced new technical challenges in the field of electronic marketing. A given system for sending electronic marketing communications may require interaction among tens or dozens of disparate communication services. These services may include separate systems for selecting marketing content (e.g., promotions or products promoted, and attendant text, images, videos, uniform resource locators), formatting selected content (e.g., systems for determining the size and relative positioning of selected content), selecting the type of electronic marketing communication (e.g., determining whether to send a communication as an email or a push notification), scheduling transmission of the electronic marketing communication (e.g., determining when a consumer is most likely to be receptive to a given electronic marketing communication, managing how frequently electronic marketing communications are sent to a particular consumer), and more. In order to test the impact of one or more factors affecting the performance of a given electronic marketing communication, system administrators must manually configure each service separately. Even then, changes made to one system for a first campaign (e.g., altering promotion content) may fail to take into account changes made to another system for a second campaign (e.g., altering transmission cadence), and manipulation of multiple variables at the same time may complicate derivation of accurate results. For example, because the aforementioned promotion content service does not notify the transmission cadence service that an experiment is running, negative results for electronic marketing communications altered by the promotion content service may be interpreted as negative results for alterations made by the transmission cadence service, or vice-versa.

Recognizing these and other problems, the inventors have recognized a need for methods, systems, and apparatuses that provide a robust framework for enabling intra-service communication and management of experiments to improve the process by which electronic marketing communications are generated. To this end, the inventors have developed services, systems, and applications that are capable of accepting a set of experiment configuration parameters. Embodiments use these experiment configuration parameters to identify particular factors and levels for manipulation to generate a set of experiment treatments that result in testing of the impact of the selected factors and levels. Embodiments function to programmatically notify particular communication services to cause those communication services to implement the selected factors and levels. Embodiments further provide a framework for establishing statistically significant sample sizes, controlling the assigned audience, mapping a set of clickstream data to particular experiment treatments, and providing real-time programmatic feedback to dynamically alter the experiment. Embodiments also provide for tools to assist with blocking of an experiment audience to improve the accuracy of results.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to manage transmission of electronic marketing communications as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, experiment configuration circuitry 210, experiment management circuitry 212, result analysis circuitry 214, and communication service circuitry 216. The apparatus 200 may be configured to execute the operations described above with respect to FIG. 1 and below with respect to FIGS. 4-11. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The experiment configuration circuitry 210 includes hardware configured to receive input to configure one or more experiments, and to process that input into a format suitable for use by the experiment management circuitry 212. The experiment configuration circuitry 210 may be configured to execute an application or applications suitable for receiving experiment configuration parameters and to generate one or more data structures corresponding to an experiment having the received parameters. For example, the experiment configuration circuitry 210 may include a graphical user interface allowing a user to select particular factors, levels, audience characteristics, and the like to define an experiment or experiments. The experiment configuration circuitry 210 may also include hardware and software configured to programmatically define experiments, such as in response to receiving particular results from a previous experiment. The experiment configuration circuitry 210 may include an interface populated with factors and levels dynamically received from one or more communication services executed or managed by the communication service circuitry 216. For example, upon initialization of an experiment service or communication service, the communication service may report the factors and/or levels that the communication service is configured to receive for use in experiments, and the reported factors and levels may be included in a graphical user interface provided by the experiment configuration circuitry 210, such that a user may select those factors and levels via the user interface. The experiment configuration circuitry 210 may include a processor, such as the processor 202, to execute one or more applications to provide the functionality of the experiment configuration circuitry 210. The experiment configuration circuitry 210 may provide a graphical user interface via the input/output circuitry 206 and/or the communications circuitry 208, such as on a local display device (e.g., via the input/output circuitry 206) or by a hosted web application (e.g., via the communications circuitry 208).

The experiment management circuitry 212 may include hardware configured to initiate, monitor, control, and manage experiments as created by the experiment configuration circuitry 210. The experiment management circuitry 212 may operate to communicate with one or more communication services to notify those communication services what particular factors and levels should be employed based on a set of experiment definitions. In some embodiments, the experiment management circuitry 212 may implement a communications mechanism with the communication services such that the communication service calls an Application Programming Interface (API) function when generating an electronic marketing communication to notify the experiment management circuitry 212 and to receive one or more levels for one or more factors implemented by the communications service in response to the API function call. The experiment management circuitry 212 may provide one or more callback functions, applications, processes, or the like for managing these and other API calls. The available factors/levels for the communication service(s) may be stored as communication service capability data stored in a memory, such as the memory 204.

The experiment management circuitry 212 may also be configured to manage experiment audiences, including determining which consumers are associated with which experiment at any given time. The experiment management circuitry 212 may be configured to manage a plurality of experiments at any given time. The experiment management circuitry 212 may also be configured to store and manage experiments defined by the experiment configuration circuitry 210. The experiments may be stored as a set of experiment model data stored in a memory, such as the memory 204. To perform these functions and various other functions as enumerated herein, the experiment management circuitry 212 may include a processor, such as the processor 202. Embodiments of exemplary implementations of these features and other features of the experiment management circuitry 212 are described further below with respect to FIGS. 3-11.

The result analysis circuitry 214 may include hardware configured to receive electronic data, such as clickstream data, associated with one or more electronic marketing communications. These electronic marketing communications may have been generated according to one or more experiments managed by the experiment management circuitry 212, and the result analysis circuitry 214 may provide a mapping of received clickstream data to particular treatments, consumers, and/or experiments. In some embodiments, the result analysis circuitry 214 uses an attribution model to attribute particular logged and tracked events to particular consumers, treatments, and/or experiments. The result analysis circuitry 214 may also be configured to derive conclusions based on the received clickstream data and a mapping to particular treatments and/or levels associated with the experiment. For example, the result analysis circuitry may receive an indication of which consumers were associated with successful electronic marketing communications, which consumers were associated with unsuccessful electronic marketing communications, and, of those consumers, which were associated with particular treatments and/or levels as defined by an experiment. The result analysis circuitry 214 may use this data to identify a correlation between the success of a particular treatment and particular levels of factors used in that treatment.

The term "success" in the context of determining whether a particular treatment or electronic marketing communication was "successful" may be defined in a variety of ways. For example, "success" may mean that a consumer clicked at least one promotion associated with the treatment, that the consumer purchased a product or service associated with the treatment, that the consumer shared a particular product or service associated with the treatment via a social media website, or any other factor that may be deemed worthy of tracking and analysis. It should be appreciated that different experiments may have different "success" criteria, and such criteria may be dynamically defined, such as by interaction with the experiment configuration circuitry 210. The experiment configuration circuitry 214 may include a processor, such as the processor 202, to perform these functions. Clickstream data and various other data used for measurement of results and attribution of data to a particular treatment/experiment may be received for a communication interface, such as the communications circuitry 208.

The communication service circuitry 216 includes hardware configured to participate in a process for generating and transmitting one or more electronic marketing communications. In this regard, the communication service circuitry 216 may implement the functionality of a plurality of separate services and/or applications. For example, communication services implemented by the communication service circuitry 216 may include, without limitation, services for selecting content for electronic marketing communications (e.g., selecting particular promotions or products to be advertised, selecting types of promotions or products, selecting content generator applications that in turn provide content), services for determining whether and when to send electronic marketing communications (e.g., services that determine what time of day, day of week, or month of year to send electronic marketing communications, or services that implement criteria-based transmission of electronic marketing communications), services that manage a transmission frequency of an electronic marketing communication (e.g., a service that ensures that consumers do not receive electronic marketing communications with greater than a particular frequency), or the like. The communication service circuitry 216 may communicate with the experiment management circuitry 212 to notify the experiment management circuitry 212 of which factors and/or levels are available to control the particular communication services implemented by the communication service circuitry 216. The communication service circuitry 216 may subsequently receive instructions from the experiment management circuitry 212 to adjust levels for outgoing electronic marketing communications for use in experiment treatments. This and other functionality of the communication service circuitry 216 may be implemented by one or more applications executing on a processor, such as the processor 202, or a communication interface, such as the communications circuitry 208. It should also be appreciated that, in some embodiments, one or more communication services are implemented on computing nodes located remotely to the apparatus 200, and the communication service circuitry 216 of the apparatus may include hardware configured to provide a remote interface (e.g., an API interface) for communicating with those remotely executing communications services.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions. Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by offering a flexible, robust framework for implementing experiments without requiring direct control or intervention to reconfigure individual communication services. Embodiments also provide for programmatic configuration of experiment configuration parameters and mapping of clickstream data to particular electronic marketing communications and experiment treatments for the purpose of generating experiment results. These improvements serve to reduce the number of electronic marketing communications that must be sent by the server 302 in order to produce sales, conserving system resources.

Exemplary Interactions Between Services

FIG. 4 illustrates an example data flow interaction 400 among a plurality of services implementing embodiments of the present invention. An experiment configuration client 402 may be employed to define a set of experiment configuration parameters for an experiment to be implemented by an experiment service 404. The experiment configuration client 402 may be similarly configured to and/or implemented by the experiment configuration circuitry as described above. The experiment service 404 may be similarly configured and/or implemented by the experiment management circuitry as described above.

The experiment service 404 may implement an API that allows communication with one or more experiment clients 408. The experiment clients 408 may be functionality implemented alongside of or as part of one or more participating services 410. The participating services 410 may be communication services as described above. In operation, the participating services 410 may employ the experiment clients 408 to access or register with the experiment service 404. When a given participating service 410 is initialized, the experiment client 408 associated with the participating service 410 may notify the experiment service 404 of the availability of the participating service 410 to be configured by the experiment service 404.

As noted above, the experiment service 404 may provide instructions to the participating services 410 via the experiment clients 408 to configure the participating services 410 with particular levels of particular factors. Configuration of the participating services 410 may be performed via an API. For example, upon generation of an electronic marketing communication, the participating service generating the electronic marketing communication may perform an API function call to notify the experiment service 404 of the newly generated electronic marketing communication. In some embodiments, the API function call may include an identifier for the particular electronic marketing communication, an identifier for the intended recipient of the electronic marketing communication, some other identifier that may be used by the experiment service 404 to determine if the electronic marketing communication should be used as a treatment in an experiment.

Upon receiving the API function call from the experiment client 408, the experiment service 404 may access a datastore containing one or more experiment models 406. The experiment service 404 may use the experiment models to determine whether the electronic marketing communication, consumer identifier, or other identifier indicated in the API function call is associated with an ongoing experiment. The experiment service 404 may utilize the experiment models 406 to associate the electronic marketing communication with an audience (or determine if the electronic marketing communication is already associated with an audience, campaign, or the like), and to select a particular level for one or more factors implemented by the calling participating service 410. The selected particular level may be provided to the participating service 410 in response to the API function call, and the participating service 410 may use the assigned level to control generation of the electronic marketing communication. Upon selecting a level for use by the participating service, the experiment service 404 may store an indication that the level is associated with a particular treatment represented by the electronic marketing communication that is generated by the participating service 410. It should also be appreciated that in some embodiments multiple participating services may participate in the generation of a single electronic marketing communication, such that each participating service 410 performs a separate API function call requesting levels from the experiment service 404. In such scenarios, the experiment service 404 may utilize an identifier associated with the consumer recipient of the electronic marketing communication or a common identifier associated with the electronic marketing communication to select which levels to apply to the electronic marketing communication and to track the applied levels for use as a treatment. In this manner, the experiment service 404 may assign different levels to different electronic marketing communications to assist with audience selection and to ensure that proper sampling and statistical analysis techniques are employed (e.g., by ensuring a proper mix of levels across treatments).

To track the results of the experiment, embodiments may receive user events 414 and a tracking log 412 which are aggregated as a universal clickstream 416. The user events 414 may include, for example, user interface interactions such as products or services viewed from selections in emails, products or services viewed on a web page, products or services viewed in a mobile application, the amount of time spent viewing a particular product, advertisements clicked on, interactions with social media sites, or the like. The tracking log 412 may include logs of events monitored by a promotion and marketing service, such as product purchases, product shipments, and the like. The universal clickstream 416 may represent an aggregation of the user events 414, the tracking log 412, and any other data that may be employed to determine the success of a particular experimental treatment.

Assessment of the results of the experiment may be performed by associate data included in the universal clickstream 416 with particular experiment treatments. As noted above, the universal clickstream 416 includes data that may be analyzed to determine a performance characteristic of a given experimental treatment. This data may include, for instance, events that indicate that a consumer viewed a product or service, that a consumer purchased a product or service, or various other events. In some embodiments, experiment models may define particular events or criteria used to control measurement of performance characteristics derived from results. For example, a first experiment may seek to analyze the impact of a particular factor on a product viewing rate, while another experiment may seek to analyze the impact of a particular factor on a product purchase rate. Some experiments may also include analysis of multiple different results, such as experiments that seek to measure the impact of a particular factor on both a product viewing rate and a product purchase rate.

The universal clickstream 416 may be accessed by an initial data aggregation service 420 and an enterprise data warehouse aggregation service 422 to derive the results of running experiments. The initial data aggregation service 420 may be used to generate initial real-time results for the purpose of test validation (e.g., verifying that levels are properly being set for outgoing treatments), monitoring (e.g., verifying that clickstream data associated with particular experiments is being received), for quick turnaround experiments, and the like.

The enterprise data warehouse aggregation service 422 functions to store and manage data derived from the received universal clickstream 416. As part of data warehousing operations, the enterprise data warehouse aggregation service 422 may apply an attribution model to attribute particular events from the clickstream to particular consumers and to particular electronic marketing communications. For example, the enterprise data warehouse aggregation service 422 may use a consumer identifier associated with a particular consumer (e.g., as derived based on a cookie or other tracking element associated with an entry in the clickstream), and identify the electronic marketing communications that have been sent to that consumer. If a promotion associated with the event in the universal clickstream was sent to the consumer previously, then the enterprise data warehouse aggregation service 422 may attribute the clickstream event (e.g., viewing the page for a promotion) with the electronic marketing communication (e.g., an email mentioning the particular promotion). In some embodiments, the enterprise data warehouse aggregation service 422 may perform more complicated mappings between the universal clickstream 416 and particular electronic marketing communications. For example, a universal clickstream 416 event may only be associated with a particular electronic marketing communication if the clickstream event occurs within a particular time window (e.g., 1 hour, 1 day, 1 week, or one month) after transmission of the electronic marketing communication to the consumer. The attribution model 424 may include various rules and parameters for association between particular electronic marketing communications and particular events from the universal clickstream 416.

A data analysis service 428 may use data gathered by the initial data aggregation service 420 and the enterprise data warehouse aggregation service 422 to determine results of the experiment by determining the impact of different treatments on the manner in which electronic marketing communications are perceived by consumers. For example, the data analysis service 428 may determine the correlations between particular levels and a performance characteristic (e.g., the "success") of one or more electronic marketing communications at increasing page views, product purchases, or the like. The data analysis service 428 may also perform regression analyses and other statistical modeling techniques to identify the impact of particular levels on the performance characteristics of an electronic marketing communication, a campaign, or the like. The data analysis service 428 may also perform different analyses based on the parameters of the experiment. For example, data associated with an "A/A" test experiment used to measure statistical "noise" would be analyzed in a different manner than an "A/B" test used to compare two or more particular levels of a factor, which would in turn be analyzed differently from a "factorial" experiment designed to evaluate a plurality of factors and/or levels.

A data visualization service 426 may be employed to view the results derived from the initial data aggregation service 420 and the data analysis service 426. The data visualization service 426 may include various interfaces, tables, spreadsheets, and the like to provide users of the system with the results of running experiments. The data visualization service 426 may, for example, provide results in real-time from the initial data aggregation service 420 with more detailed data provided at regular intervals by the data analysis service 426.

The data analysis service 426 may also provide results to an experiment feedback service 418. The experiment feedback service 418 may monitor results provided by the data analysis service 426 and identify particular results that warrant adjustment to ongoing experiments or creation of new experiments. For example, in the case of a "king of the hill" experiment that is designed to identify an optimal factor/level pairing or group of factor/level pairings, if a particular treatment performs at least a threshold amount worse than one or more other treatments (e.g., a certain number of standard deviations worse than other treatments, or below some particular threshold performance characteristic), then the experiment feedback service 418 may automatically remove that treatment from use in future electronic marketing communications by notifying the experiment service 404. The experiment feedback service 418 may include various additional and alternative rules, scripts, and criteria for altering running experiments and defining new experiments. For example, in some embodiments a script may implement the "king of the hill" experiment type as described above with a lowest performing level of a particular factor removed at periodic intervals until only a top level of the factor remains.

Example Data Flow Among System Components

FIG. 5 illustrates an example data flow interaction 500 among components of a system implementing a system for conducting experiments using electronic marketing communications in accordance with some exemplary embodiments of the present invention. In some embodiments, the data flow 500 illustrates interaction among components of an apparatus such as the apparatus 200 described above.

The data flow 500 illustrates the interaction between an experiment service 502, one or more communication services 504, and a response tracking service 506. The experiment service 502 includes an experiment management component 514, a communication service interface component 510, an experiment configuration interface 512, a result analysis component 522, and a result visualization component 524. The communication service interface component 510 may receive and/or store a set of communication service capability data 516. The experiment management component 514 may access a set of experiment model data 518. The audience management component 520, the communication services 504, and the response tracking component 506 may access a set of audience data 508.

The experiment configuration interface 512 may include one or more interfaces for receive manual or programmatic definition of experiment configuration parameters, such as described above with respect to the experiment configuration circuitry described in FIG. 2. The experiment configuration interface 512 may provide the received experiment configuration parameters to the experiment management component 514 for use in creating one or more experiments. The experiment management component 514 may be implemented, for example, by experiment management circuitry as described above with respect to FIG. 2.

The experiment management component 514 may interact with a communication service interface component 510 to determine the capabilities of the communication services 504. For example, the communication service interface component 504 may implement an application programming interface that provides a mechanism by which the communication services 504 may inform the experiment management component 514 of the particular factors and levels that may be used to control each communication service 504. The associations between particular communications services and available factors and/or levels may be stored in the set of communication service capability data 516. When the experiment management component 514 receives a set of experiment configuration parameters from the experiment configuration interface 512, the experiment management component 514 may identify any factors and/or levels defined in the experiment configuration parameters and, using the communication service capability data 516, determine which of the communication services 504 support the factors and/or levels defined in the experiment configuration parameters. At runtime, each communication service 504 may perform an API function call upon performing an action for which the communication service 504 is configured to be controlled by a particular level provided by the experiment management component 514. For example, upon reaching a point in a process flow where a content selection service is prepared to select content for an electronic marketing communication, the content selection service may perform an API function call to receive one or more levels from the experiment management component, such that the levels impact the process by which content is selected for the electronic marketing communication.

The experiment management component 514 may also interface with the audience management component 520. The audience management component 520 may provide an interface for selecting an audience for an experiment by accessing a set of audience data 508. The audience data 508 may include, for example identifiers, contact information, and the like for one or more consumers that are possible addressees of electronic marketing communications generated by embodiments of the present invention. The audience data 508 may be divided into various groupings, including arbitrarily assigned groupings, groupings based on common characteristics, or the like. In some embodiments, consumers are randomly assigned into groups according to a hashing algorithm, and particular experiments may be assigned to a particular group of groups of the audience. In some embodiments, the hashing algorithm is salted with a particular value to provide for randomized assignment of consumers to particular groups. In some embodiments, the audience management component 520 provides for logging of these hashing operations and the salt value applied to allow for mapping of particular audiences to particular experiments even after the set of audience data is re-salted.

When receiving an API call from a communication service 504 via the communication service interface component 510, the experiment management component 512 may query the audience management component 520 and/or experiment model data 518 to determine whether a consumer associated with the API call is part of a particular experiment. For example, the experiment model data 518 may include a list of audience members associated with each particular experiment. A detailed example of a domain model for storing experiment data is described further below with respect to FIG. 6.

The response tracking service 506 may monitor incoming data, such as a universal clickstream as described above, to determine events that occur that are possibly related to one or more running experiments. The response tracking service 506 may provide these events to a result analysis component 522. The result analysis component 522 may be implemented by result analysis circuitry, such as described above with respect to FIG. 2. The result analysis component 522 may perform a mapping between particular events and experimental treatments. For example, each event in the universal clickstream may be associated with a particular consumer, campaign, or the like. The result analysis component 522 may analyze experiment model data 518 accessible to the experiment management component 514 to determine whether any given clickstream event is associated with a particular experiment. For example, the experiment model data 518 may include a mapping of each consumer to each experiment to which that consumer has been assigned. If the consumer associated with the clickstream event is assigned to an experiment, then the clickstream event may be analyzed to determine a data point for analysis for that particular experiment. A plurality of results, and/or data derived therefrom may be provided for viewing and analysis via a result visualization component 524. The result visualization component 524 may display or otherwise provide one or more interfaces for selecting particular experiments, viewing the results of the selected experiment, and the like.

The result analysis component 522 may also compare the results of the particular experiment to a set of criteria for altering an experiment, such as may be defined in a set of analysis scripts (not pictured). The result analysis component 522 may utilize these analysis scripts to programmatically alter running experiments and/or define new experiments. For example, as indicated above, if a particular treatment or level is associated with results that indicate the treatment or level is performing particularly poorly, then the treatment or level may be removed from future assignment while the experiment is still ongoing.

Each communication service 504 may include a communication management component 526 and an experiment interface component 528. The communication management component 526 may include logic that enables the communication management component 526 to perform one or more parts of a process for generating an electronic marketing communication (e.g., content selection, cadence selection, communication type selection, actual transmission of the electronic marketing communication, or the like).

At particular points within the logic flow of the communication management component 526, the experiment interface component 528 may be called to request experiment configuration parameters (e.g., levels) from the experiment management component 514. The experiment interface component 528 may be, for example, an API function executed by the communication service 504. The communication management component 526 may provide an identifier, such as an electronic communication identifier or a consumer identifier, to the experiment interface component 528. In response, the communication management component 526 may receive a level or levels as defined by the experiment interface component 528. These levels may be used by the communication management component 526 to alter the process by which the electronic marketing communication is created or transmitted by the communication service 504. In this manner, embodiments advantageously allow for communication services to control how particular levels are implemented within the communication service, resulting in a loose coupling between the implementation of the experiment service 502 and the communication services 504. Each communication service 504 may be expected to be able to handle its own particular set of factors and levels, such that the only input provided by the experiment service in response to a function call is one or more appropriate levels. The communication service 504 may then utilize those levels to configure the outgoing electronic marketing communication appropriately. The communication service 504 may notify the experiment service 502 of which levels it is capable of utilizing during runtime, upon initialization, or at various other points in the process. In some embodiments, particular features of a given communication service 504 may be dynamically enabled during runtime of the experiment service 502 based on code updates applied to the communication service 504 or according to various other criteria (e.g., a particular time/date passing, certain content being enabled for selection, new content being added to a database, or the like).

Exemplary Domain Model

FIG. 6 illustrates an exemplary domain model 600 for storing data (e.g., an experiment model) associated with a particular experiment as used by an experiment service in accordance with some embodiments. It should be appreciated that while specific data structures and variables are described with respect to the domain model 600, not all examples of such data structures will necessarily include the same structures and some embodiments may include additional structures or variables. The domain model 600 includes a data structure defining an experiment 602. The experiment structure 602 includes an identifier for the experiment, a type of the experiment (e.g., A/A test, A/B test, factorial test), a defined start time and end time, a text description of the experiment (e.g., a short description to indicate to a user the subject of the experiment), the status of the experiment (e.g., pending, running, completed), and an audience salt value. Each experiment 602 may be associated with a set of factors 604. The factors 604 may each include a factor identifier and a description of the factor. The factors 604 may be compared to a set of communication service capability data to determine which communication services support which particular factors, such that when a request is received from a communication service that supports a factor associated with the experiment, and appropriate response is provided. Each factor 604 may include two or more mutually exclusive levels 606. Each level 606 specifies a setting or settings for a communication service that is interpreted by the communication service to configure the communication service to act in a particular manner. The levels 606 are interpreted as settings 608 by the corresponding communication service. Each level may be a corresponding identifier and description. The levels 606 may include one or more settings 608 that represent the application of the level to a particular communication service. The settings 608 may include a JavaScript Object Notation (JSON) map of the particular setting values as applied to the application. In some embodiments, an experiment management component may respond to an API request from a communication service with the JSON map corresponding to the settings for a particular level as determined for that particular communication service.

Based on the experiment type, the experiment 602 includes a set of one or more treatments 610, which are a combination of levels as derived from the experiment factors. For example, an A/A test would typically include a single factor with a single level, repeated a number of times across different treatment groups. An A/B test would typically have a single factor with two levels, resulting in two treatments. A factorial experiment would typically include multiple factors, each with two or more levels. The treatments 610 may therefore result from the standard factorial combinations. Treatment names may be derived from particular experiment configuration parameters, such as the experiment type, an experiment ID, factor levels, and replicate number (e.g., in cases where the same treatment is sent multiple times). Treatment names may therefore become an implementation detail that is also exposed to tracking services, such as an enterprise data warehouse aggregation service as described above. Treatment settings 612 may define the manner in which the particular treatment is implemented by a given communication service.

The experiment 602 is associated with an audience definition 614. The audience definition 614 may be criteria-based, layer-bucket based, or some other means, and may be open for extension. At runtime, the experiment 602 assigns a treatment to a consumer upon identification of the consumer by a calling communication service. The results of the treatment are subsequently tracked through a set of clickstream data as described above. The audience definition 614 may include a plurality of consumers, represented as users 618. The audience definition 614 may also be associated with a group of treatments 616, which are made of a plurality of treatments 610 and which provide associations between particular groups of treatments and groups of consumers 618.

When an experiment is defined by an experiment configuration component, various experiment configuration parameters may be utilized to generate the experiment model pictured in FIG. 6. For example, the experiment configuration component may provide the capability to select a variety of features and parameters that, in turn, are used to generate the experiment model. The following tables depict some non-limiting examples of features and configuration options that may be selected or enabled through the use of an experiment configuration component and which inform creation of the experiment model 600.

TABLE 1

| Feature | Description |
| --- | --- |
| Multi-service experiments (with upstream filtering) | By applying the treatment at the point of diversion, only users exposed to the experiment would be involved, so the treatment groups can remain balanced. |
| Simple simultaneous experiments | A user may be assigned to multiple experiments. Layers can identify experiments that are assumed to be independent. In the independence case, a user may be tracked by all assigned experiments. |
| Sophisticated simultaneous experiments | In some scenarios, intermingling of experiments may cause data analysis problems. This feature provides for tracking of interdependent experiments. |
| Hold out group | The ability to assign users to experiment-level and longitudinal "hold-out" groups (longitudinal = across a set of experiments). Hold-out groups do not receive a particular treatment, but are included in the analysis. |
| Within-run replicas | Sometimes, it may be worthwhile to replicate an experiment within the same run (e.g., by having two treatments with the same levels). An experiment may be set up with replica of the treatment, and the experiment service may generate the appropriate replicas, assigning appropriate treatment groups to each. |
| Back-to-back replicas | Sometimes it may be worthwhile to repeat an experiment during a different time window. In this case, the experiment service may create an experiment clone, but link its analysis through a blocking factor. Audiences may be reshuffled between experiments with different salts. |
| Exclude specific treatments | In some cases, a particular combination of levels may produce a known-bad experience. In a do-no-damage mode, the experiment service may allow a treatment tag that excludes it from assignment. By having all application settings visible for a treatment, the experiment service can inspect the settings for such conditions. |
| Include more users in some treatments | An experimenter may want to add more users to some treatments than others. An experiment may configure its audiences with specific ranges of audience members. These ranges may be non-contiguous. [0-10, 14-34, 500-562] |
| Memory-free experiments | An experiment may assign users randomly to audience groupings at each run, thus getting enough responses, but limiting multiple exposures for the same specific user. Such a scenario may use a memory-free audience to treatment assignment strategy. For example, a performance test might use this feature. |
| Manual Dial-up/Dial-down | In the case of an experiment type, such as king-of-the-hill, an experimenter may want to alter the proportion of users to favor 'winning' treatments over 'losing' treatments. In this case, a user to treatment assignment strategy may shift buckets from one treatment to another through the experiment service update. Hold out groups may count as a bucket source or sink, if an experiment wants to reduce or expand its reach. |
| Automated Dial-up/Dial down | The system may perform audience grouping dynamically based on statistical tests. |
| Multi-touch experiments | Sometimes, an experiment has a first touch on one day, and then multiple follow-up touches on subsequent days. In this case, a consumer that gets assigned to such an experiment would be set up to arrive at this experiment again. That is, any upstream filters may pass this user on subsequent days by querying the experiment service. In this case, the downstream service and the upstream service may both have settings in the treatment. |
| Developer-only experiments | An experiment may need to be tested before release to a real audience. In this case, a treatment may include a list of 'forced users' (e.g., QA testers, system developers) that always receive a treatment when the developer-only setting is enabled. An experiment property may include the developer-only experiments alongside production as well. |
| Predicting experiment reach | Given a set of audience groupings and a number of treatments, and some idea of filtering percent, this feature may provide a way to estimate the reach of each treatment, and thus the statistical power. |
| Audience filtering eligibility | An audience criterion may specify some derived segmentation, such as an engagement score (e.g., a frequency with which a given consumer has purchased a product or promotion, or a frequency with which the consumer views products or promotions advertised in an electronic marketing communication). Some experiments may test treatments against such segments. At treatment assignment, an assignment strategy may determine the consumer's segment and select a treatment based on that segment. Alternatively, the client may supply a segment along with the consumer, to determine a matching treatment. |

TABLE 1-continued

| Feature | Description |
| --- | --- |
| Stratified sub-samples | If an audience criterion contains a certain proportion of rare but influential sub-groups, then treatment groups may also contain those same proportions of sub-groups. An audience service could provide this mapping. |
| Preflight experiment settings | Ahead of any experiment, a participating service may test a setting to confirm its behavior. Then, that service may communicate the setting and values to the experimenter, who may include it in a level, within the experiment definition. |
| Ability to apply setting per user call | Once the participating service has called the experiment client, it may apply the settings returned by the experiment client. These settings are controlled by the application, and may be defined ahead of any experiment. |
| Attribution | Once raw data arrives (e.g., via the clickstream), the raw data passes through aggregation and attribution. Depending on the experiment, different aggregation and attribution strategies may be applied. |
| Response funnel | Embodiments may record all elements of a "push" platform response funnel (e.g., interactions with a mobile application), including application opens, clicks, conversions, gross bookings, and/or gross revenue. |
| Projection | After analysis, some factor levels may be identified as more important than others. Remaining factor levels may be collapsed into a simpler predictive model. It may not be known ahead of time which factors are important and which are not. If the initial experiment is analyzed using a scripting tools, such as R, then a data scientist may modify that script to include only the important effects and interactions. |
| Covariate analysis | After an experiment ran, other attributes could be used to understand deeper relationships. For example, consumer attributes may be used to understand how male/female gender, east/west coast locations, and the like affect responses. |
| Data transformation | Sometimes the experimenter may want to understand average values, but other times, the experimenter may want to understand percentage lift, or other kinds of statistics. Based on the statistics, the experimenter may be able to use simple averaging, but other data may require log transformation, or other transformations. While compiling responses, an experiment may specific a data aggregation pipeline from a small number of choices. |
| Replay data aggregation | Under some circumstances, it is required to replay raw data through the aggregation process. For example, an administrator may have restored data, the data aggregation pipeline may have changed, outliers may have been identified, or it may be desirable to remove a specific date window (e.g., Black Friday). |
| Outlier and date window exclusion | Once an experiment has run, exclusion criteria may be specified on the audience, date range or treatment. These exclusions may be applied during data aggregation and subsequent analysis scripts. |
| Automated feedback into new experiments | Some experiments can rely on results from previous experiments to down-select choices. In this case, an automated data aggregation pipeline followed by an analysis script may produce relative scores among treatments. Those scores may be used to set up a second experiment from the initial experiment, with reduced choices. |
| Display automated results | The system may run the analysis scripts based on data aggregation output, and produce decoration data series for statistical significance. These decoration data series could be incorporated into a dashboard |
| Display adjusted results | The system may run a data-analyst modified analysis script and display the results in the same manner as the automated results. |

Exemplary Processes for Implementing a Message Management System

FIGS. 7-11 illustrate flow diagrams depicting processes for implementing the message management systems described above with respect to FIGS. 1-6 to provide a dynamic experimentation service for use in generation of electronic marketing communications in accordance with some embodiments.

FIG. 7 illustrates a flow diagram depicting an example of a process 700 for generating an electronic marketing communication for use in an experiment in accordance with embodiments of the present invention. The process illustrates how experiment configuration parameters may be received and used to define a group of recipients of particular experiment treatments. As communication services generate and transmit electronic marketing communications, the communication services interact with an experiment service to "check in" and determine whether the communication service should alter its processing to participate in an experiment. The process 700 therefore provides for altering an outgoing electronic marketing communication to use that electronic marketing communication as an experiment treatment. The process 700 may be performed by an apparatus, such as the apparatus 200 described above with respect to FIG. 2, and/or components of the experiment service as described with respect to FIGS. 4-5.

At action 702, a set of experiment configuration parameters are received. As noted above, the experiment configuration parameters may include, for example, particular factors and/or levels to be tested, particular results to be monitored (e.g., product purchase or product view), a type of experiment (e.g., A/A test, A/B test, factorial test), audience definitions, and various other flags or configuration settings in support of the features identified above with respect to Table 1. In some embodiments, the experiment configuration parameters may only identify factors and not levels, and as such the experiment may cycle through all possible levels associated with a particular factor. It should also be appreciated that, prior to receiving the experiment configuration parameters, the process 700 may have initialized one or more communication services which each provide an indication of which factors and/or levels the communication services are configured to utilize.

At action 704, an experiment model is generated based on the experiment configuration parameters. As described above with respect to FIG. 6, the experiment model may include a defined set of factors, levels, treatments, settings, audience groupings, and the like that are designed to perform the experiment. At action 706, the experiment model is stored in a memory.

At action 708, a notification, function call, or the like is received from a communication service, indicating that the communication service is requesting a determination to be made as to whether to alter one or more levels associated with generation or transmission of an electronic marketing communication. The call may include a communication identifier indicating a particular outgoing electronic marketing communication (e.g., that is in the process of being generated), and/or an identifier for a particular consumer. At action 710, a determination is made as to whether the communication identifier meets the requirements of the experiment model. For example, the determination may indicate that a consumer identified by the identifier is part of the audience of an experiment, or that the particular electronic marketing communication is associated with some other criteria that make the electronic marketing communication eligible for use in the experiment defined in the experiment model.

At action 712, if the communication identifier is associated with the experiment model, the process 700 proceeds to action 714. Otherwise, the process 700 proceeds to action 720. At action 714, the process 700 selects an experiment level according to the experiment model. For example, the process 700 may select a particular treatment with one or more levels for use by the calling communication service. Alternatively, in some embodiments the process 700 may not select any particular level, but may still associate the electronic marketing communication with the experiment, such as in cases where a "control" or "hold out" group is specified.

At action 716, the communication service is notified of the selected level. In some embodiments, notification of the selected level may include mapping the level to a particular setting or group of settings associated with application of the selected level to the particular application. At action 718, an association between the communication identifier and the particular level is stored for use in results analysis to attribute a particular set of results with the particular factor level. If the communication identifier is not identified as associated with the experiment model, then the process 700 may end at action 720 without providing any settings to the communication service, or by notifying the communication service that default processing should be employed.

FIG. 8 illustrates a flow diagram depicting an example of a process 800 for implementing a dynamic experimentation system from the perspective of a communication service in accordance with some embodiments. As described above, an experimentation service may serve to generate experiment models and to handle calls from communication services requesting levels to be used for generation or transmission of electronic marketing communications. The process 800 illustrates the manner in which these communication services may perform processing to apply factor levels to electronic marketing communications. The process 800 may be performed by communication service circuitry, such as the communication service circuitry 216 described above with respect to FIG. 2.

At action 802, the process determines a communication identifier for an outgoing communication. The communication identifier may be a unique identifier for a particular electronic marketing communication that has been created by the communication service or another communication service, the communication identifier may be a unique identifier for an electronic marketing communication under construction or to be generated by the communication service, the communication identifier may be an identifier associated with a proposed recipient of the electronic marketing communication, or any combination thereof or incorporating other mechanisms for identifying the particular electronic marketing communication. At action 804, a call is made to an experiment service with the communication identifier to request one or more levels to be used in generation of transmission of the electronic marketing communication. At action 806, a response is received from the experiment service, indicating whether the communication identifier indicates that the electronic marketing communication is to have any levels applied. At action 808, a determination is made as to whether the response includes any levels and/or settings for use in generation or transmission of the electronic marketing communication. If so, the process 800 proceeds to action 810. If the response does not contain any levels or settings, or the response includes an indication that no levels or settings are to be applied, the process 800 proceeds to action 812.

At action 810, the electronic marketing communication is generated using the received experiment levels/settings. As described above, different communication services may implement received experiment levels or settings in different ways, depending upon the particular configuration of each communication service. For example, a content selection service may have specific content defined by the levels/settings, or the content selection service may have a general category of content defined by the levels/settings. An email cadence communication service may receive levels/settings that alter the rate at which a particular consumer receives email. In some embodiments, particular levels or settings may also have sub-levels that define subsets of broader categories of settings.

At action 812, if the response does not include particular levels/settings, or if the response indicates no levels/settings will be provided, the electronic marketing communication may be generated according to default processing of the communication service.

FIG. 9 illustrates a flow diagram depicting an example of a process 900 for attributing clickstream events to a particular electronic marketing communication in accordance with some embodiments. As described above, once an electronic marketing communication has been generated according to one or more levels specified by an experiment service, deriving results from the experiment requires attributing clickstream events to particular experiment treatments so that the impact of the different levels of the treatments can be assessed. The process 900 provides an exemplary method for providing this attribution. The process 900 may be performed by result analysis circuitry, such as the result analysis circuitry 214 described above with respect to FIG. 2.

At action 902, a clickstream event is received. The clickstream event may include one or more identifiers that identify the circumstances under which the clickstream event occurred. For example, these identifiers may include a tracking cookie or other identifier associated with a particular user, an identifier for a particular electronic marketing communication that caused the clickstream event, or the like. At action 904, the identifier associated with the clickstream event may be used to identify a particular electronic marketing communication or communications with which the identifier is associated. At action 906, a determination is made as to whether the identifier is associated with any ongoing experiments. For example, if the clickstream event is associated with a consumer that received an experimental treatment recently, then the clickstream event may be relevant to the experiment associated with the experimental treatment received by the consumer. At action 908, the result associated with the clickstream event is identified. As noted above, the result may be that the consumer purchased a particular product or service, redeemed a discount or promotion, viewed a product or service, or any other interaction as described above. At action 910, the result is stored in association with the particular experimental treatment. In some embodiments, such as in the case where the identifier for the electronic marketing communication indicates each of the levels of the experimental treatment, analysis may be performed in real-time as soon as the association between the clickstream event and the treatment is identified. In other embodiments, the result and the communication are stored for later processing.

FIG. 10 illustrates a flow diagram depicting an example of a process 1000 for dynamically altering an experiment in accordance with some exemplary embodiments of the present invention. As described above, embodiments may function to dynamically alter audiences, factors, levels, and treatments while experiments are running, such as in the case where a particular level or treatment are providing poor results. In this regard, embodiments provide for the ability to utilize one or more scripts that include a set of criteria for evaluating experiment results and performing particular actions in response to particular criteria occurring.

Scripts may be associated with particular experiments, or associated with more than one experiment. For example, a given script may indicate that, if a treatment or a particular level is performing below a threshold level (e.g., below a particular number of standard deviations from other levels, or below some absolute performance threshold), then that treatment should be discontinued for further use in the experiment.

Scripts may also be employed to dynamically define additional or future experiments. For example, a script may indicate that an experiment should be run repeatedly, reducing the number of levels used by discarding the lowest performing level each time. As another example, a script may examine several levels that each have sub-levels, and the top performing level may be used as a basis for a further experiment exploring the different performance characteristics of the sub-levels of the top performing level. The process 1000 may be performed by experiment management circuitry and/or experiment configuration circuitry, such as the experiment management circuitry 212 and/or experiment configuration circuitry 210 described above with respect to FIG. 2.

At action 1002, an experiment is initiated. As described above, initiation of an experiment may include generation of one or more treatments for testing of different levels that are the subject of the experiment. At action 1004, preliminary results from the experiment are received. For example, these preliminary results may be results received from an initial data aggregation service as described above with respect to FIG. 4. At action 1006, the preliminary results are mapped to particular experiment treatments. At action 1008, a determination is made as to whether the preliminary results meet a predefined threshold. If the results exceed the threshold, the process 1000 proceeds to action 1012 to continue the experiment.

However, if the results are below the threshold, the treatment corresponding to the results that fail to meet the threshold is removed from the experiment at action 1010. In the present context, removal of a treatment may include eliminating the particular combination of levels used to generate the treatment from being used in the generation or transmission of additional electronic marketing communications by ensuring that the particular level or combination of levels is no longer provided to any communication services that call the experiment service. In this manner, the process 1000 advantageously provides for dynamic alteration of the experiment so ensure that the experiment "does no harm" by continuing to use a particular treatment that is exhibiting poor results. Embodiments may also ensure that at least a minimum sample size of results have been received for the treatment, to account for variance in results, and various other programmatic rules may be employed to modify ongoing experiments such as assisting with selection of levels, removal of levels, addition of levels, adjusting of selection weights for particular levels, combination of additional factors with a particular level, or the like.

FIG. 11 illustrates a flow diagram depicting an example of a process 1100 for managing an audience for an experiment in accordance with some embodiments. As more and more experiments are run, it becomes increasingly likely that past runs of experiments will impact the results of future experiments due to some consumers being subjected to multiple different experimental treatments. To account for this effect, consumers may be periodically "reshuffled" in the audience to redistribute particular groups of consumers who have received experimental treatments and thus reduce the impact of consumers receiving multiple treatments in succession. However, the inventors have recognized that reshuffling the audience into new groupings at arbitrary times can interfere with ongoing experiments and cause other problems with audience blocking. Accordingly, the inventors have developed techniques for tracking when such reshuffling events occur, along with which salt values are associated with which experiments in order to assist with later analysis of the results of the experiment. The process 1100 may be performed by experiment management circuitry and/or experiment configuration circuitry, such as the experiment management circuitry 212 and/or experiment configuration circuitry 210 described above with respect to FIG. 2.

At action 1102, an initial audience selection mapping is determined. For example, consumers may be apportioned into particular "buckets", with each bucket having a certain number of consumers associated with it. When performing experiments, a particular group of buckets may be assigned to the experiment, such that the consumers associated with the assigned buckets are assigned to the experiment.

At action 1104, one or more experiments are initiated using the initial mapping determined at action 1102. At action 1106, an instruction is received to reshuffle/re-salt/ rehash the consumers into different buckets. At action 1108, the audience is reshuffled. At action 1110, the time, circumstances, salt value, and other parameters associated with the audience reshuffle are logged, such that the ongoing experiment can utilize the logged data to map the previous audience to a new audience to account for factors such as the same consumer receiving the same treatment multiple times.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method for implementing a dynamic experimentation service, the method comprising:

receiving, via an experiment configuration interface, programmatic definition of a set of experiment configuration parameters;

implementing, by a communication service interface component, an application programming interface (API) for communicating with one or more experiment management components, the communicating comprising providing the set of experiment configuration parameters;

determining, by an experiment management component via a processor and based on the set of experiment configuration parameters, an experiment model, wherein the experiment model comprises electronic data indicating (1) a type of experiment, including one of an A/A test, an AB test, or a factorial test, (2) an audience selected from a plurality of consumers, (3) a set of email cadence factors, and (4) a set of promotion factors, wherein each set of email cadence factors comprises a plurality of levels, each level indicative of a setting for controlling a communication service in operation to generate an electronic marketing communication for transmission to at least one of the plurality of consumers, wherein each level of the plurality of levels is indicative of a particular time period of a plurality of particular time periods between instances of electronic marketing communication;

wherein each set of promotion factors comprises a plurality of promotion levels, each promotion level indicative of a second setting for controlling the communication service in operation to generate the electronic marketing communication for transmission to at least one of the plurality of consumers, wherein each of the plurality of promotion levels is indicative of a type of promotion, including an email, a push notification, or SMS electronic marketing communication type;

determining one or more participating communication services from a plurality of communication services that support the set of email cadence factors, the set of promotion factors, and their corresponding levels defined in the experiment configuration parameters;

receiving a separate API function call from each of the one or more participating communication services, comprising a communication identifier, the communication identifier being a unique identifier indicative of a respective electronic marketing communication that is under construction, and wherein the communication identifier identifies a particular consumer recipient of the respective electronic marketing communication;

assigning, to each of the one or more participating communication services, a level from among the plurality of levels, the level indicative of one particular time period from among the plurality of particular time periods between the instances of electronic marketing communication and (ii) one promotion level from among the plurality of promotion levels, the one promotion level being indicative of the type of promotion, the type of promotion being one of an email, a push notification, or an SMS electronic marketing communication;

causing each respective electronic marketing communication to be generated as a treatment in accordance with the assigned level indicative of the one particular time period from among the plurality of particular time periods between the instances of electronic marketing communication and the one promotion level being indicative of the type of promotion;

receiving clickstream data comprising a plurality of clickstream events, wherein each clickstream event comprises a tracking cookie associated with the particular consumer recipient;

determining that at least one of the clickstream events is associated with an electronic marketing communication from among the respective electronic marketing communications;

determining that the tracking cookie is associated with the experiment model;

identifying a resulting interaction from the particular consumer recipient associated with the at least one of the clickstream events;

associating the resulting interaction with the experiment model; and enabling to change script code for exchanging or altering one or more of: the type of experiment, the audience, the set of email cadence factors, or the set of promotion factors based on the association between the resulting interaction with the experiment model.

2. The method of claim 1, wherein the communication service is at least one of a content selection service or a cadence management service.

3. The method of claim 1, further comprising:
determining a performance characteristic of the at least one level used to generate the electronic marketing communication based at least in part on the at least one clickstream event.

4. The method of claim 3, further comprising:
determining that a second of the clickstream events is associated with a different electronic marketing communication; and
determining a second performance characteristic of a different level associated with the different electronic marketing communication.

5. The method of claim 3, wherein the at least one of the clickstream events is determined to be associated with the electronic marketing communication based at least in part on the at least one clickstream event being associated with a consumer to which the electronic marketing communication was transmitted.

6. The method of claim 3, wherein the at least one of the clickstream events is determined to be associated with the electronic marketing communication based at least in part on the at least one of the clickstream events occurring within a threshold time period of when the electronic marketing communication was transmitted.

7. The method of claim 6, wherein the threshold time period is one week.

8. The method of claim 1, further comprising providing an application programming interface by which the request is received from the communication service.

9. The method of claim 1, wherein the successful previous treatment indicates one or more of: the particular consumer responded to at least one promotion associated with the previous treatment, the particular consumer purchased a product or service associated with the previous treatment, or the particular consumer shared a particular product or service associated with the previous treatment via social media.

10. A non-transitory computer readable storage medium comprising instructions that, when executed by a processor, cause the processor to:

receive, via an experiment configuration interface, programmatic definition of a set of experiment configuration parameters;

implement, by a communication service interface component, an application programming interface (API) for communicating with one or more experiment management components, the communicating comprising providing the set of experiment configuration parameters;

determine, by an experiment management component via the processor, based on the set of experiment configuration parameters, an experiment model, wherein the experiment model comprises electronic data indicating (1) a type of experiment, including one of an A/A test, an AB test, or a factorial test, (2) an audience selected from a plurality of consumers, (3) a set of email cadence factors, and (4) a set of promotion factors, wherein each set of email cadence factors comprises a plurality of levels, each level indicative of a setting for controlling a communication service in operation to generate an electronic marketing communication for transmission to at least one of the plurality of consumers, wherein each level of the plurality of levels is indicative of a particular time period of a plurality of particular time periods between instances of electronic marketing communication;

wherein each set of promotion factors comprises a plurality of promotion levels, each promotion level indicative of a second setting for controlling the communication service in operation to generate the electronic marketing communication for transmission to at least one of the plurality of consumers, wherein each of the plurality of promotion levels is indicative of a type of promotion, including an email, a push notification, or SMS electronic marketing communication type;

determine one or more participating communication services from a plurality of communication services that support the set of email cadence factors, the set of promotion factors, and their corresponding levels defined in the experiment configuration parameters;

receive a separate API function call from each of the one or more participating communication services, comprising a communication identifier, the communication identifier being a unique identifier indicative of a respective electronic marketing communication that is under construction, and wherein the communication identifier identifies a particular consumer recipient of the respective electronic marketing communication;

assign, to each of the one or more participating communication services, a level from among the plurality of levels, the level indicative of one particular time period from among the plurality of particular time periods between the instances of electronic marketing communication and (ii) one promotion level from among the plurality of promotion levels, the one promotion level being indicative of the type of promotion, the type of promotion being one of an email, a push notification, or an SMS electronic marketing communication;

cause each respective electronic marketing communication to be generated as a treatment in accordance with the assigned level indicative of the one particular time period from among the plurality of particular time periods between the instances of electronic marketing communication and the one promotion level being indicative of the type of promotion;

receive clickstream data comprising a plurality of clickstream events, wherein each clickstream event comprises a tracking cookie associated with the particular consumer recipient;

determine that at least one of the clickstream events is associated with an electronic marketing communication from among the respective electronic marketing communications;

determine that the tracking cookie is associated with the experiment model;

identify a resulting interaction from the particular consumer recipient associated with the at least one of the clickstream events;

associate the resulting interaction with the experiment model; and enable to change script code for exchanging or altering one or more of: the type of experiment, the audience, the set of email cadence factors, or the set of promotion factors based on the association between the resulting interaction with the experiment model.

11. The computer readable storage medium of claim 10, wherein the communication service is at least one of a content selection service or a cadence management service.

12. The computer readable storage medium of claim 10, wherein the instructions further cause the processor to:
determine a performance characteristic of the at least one level used to generate the electronic marketing communication based at least in part on the at least one clickstream event.

13. The computer readable storage medium of claim 12, wherein the instructions further cause the processor to:
determine that a second of the clickstream events is associated with a different electronic marketing communication; and
determine a second performance characteristic of a different level associated with the different electronic marketing communication.

14. The computer readable storage medium of claim 12, wherein the at least one of the clickstream events is determined to be associated with the electronic marketing communication based at least in part on the at least one clickstream event being associated with a consumer to which the electronic marketing communication was transmitted.

15. The computer readable storage medium of claim 12, wherein the at least one of the clickstream events is determined to be associated with the electronic marketing communication based at least in part on the at least one of the clickstream events occurring within a threshold time period of when the electronic marketing communication was transmitted.

16. The computer readable storage medium of claim 15, wherein the threshold time period is one week.

17. The computer readable storage medium of claim 10, wherein the instructions further cause the processor to provide an application programming interface by which the request is received from the communication service.

18. The computer readable storage medium of claim 10, wherein the successful previous treatment indicates one or more of: the particular consumer responded to at least one promotion associated with the previous treatment, the particular consumer purchased a product or service associated with the previous treatment, or the particular consumer shared a particular product or service associated with the previous treatment via social media.

19. An apparatus for implementing a dynamic experimentation service, the apparatus comprising:
experiment configuration circuitry configured to:
receive, via an experiment configuration interface, programmatic definition of a set of experiment configuration parameters; and
implement, by a communication service interface component, an application programming interface (API) for communicating with one or more experiment management components, the communicating comprising providing the set of experiment configuration parameters; and
the experiment management circuitry configured to:
determine, by an experiment management component via a processor, based on the set of experiment configuration parameters,
wherein the experiment model comprises electronic data indicating (1) a type of experiment, including one of an A/A test, an AB test, or a factorial test, (2) an audience selected from a plurality of consumers, (3) a set of email cadence factors, and (4) a set of promotion factors,
wherein each set of email cadence factors comprises a plurality of levels, each level indicative of a setting for controlling a communication service in operation to generate an electronic marketing communication for transmission to at least one of the plurality of consumers,
wherein each level of the plurality of levels is indicative of a particular time period of a plurality of particular time periods between instances of electronic marketing communication;
wherein each set of promotion factors comprises a plurality of promotion levels, each promotion level indicative of a second setting for controlling the communication service in operation to generate the electronic marketing communication for transmission to at least one of the plurality of consumers,
wherein each of the plurality of promotion levels is indicative of a type of promotion, including an email, a push notification, or SMS electronic marketing communication type;
determine the communication services from a plurality of communication services that support the set of email cadence factors, the set of promotion factors, and their corresponding levels defined in the experiment configuration parameters;
receive a separate API function call from each of the one or more participating communication services, comprising a communication identifier, the communication identifier being a unique identifier indicative of a respective electronic marketing communication that is under construction, and wherein the communication identifier identifies a particular consumer recipient of the respective electronic marketing communication;

assign, to each of the one or more participating communication services, a level from among the plurality of levels, the level indicative of one particular time period from among the plurality of particular time periods between the instances of electronic marketing communication and (ii) one promotion level from among the plurality of promotion levels, the one promotion level being indicative of the type of promotion, the type of promotion being one of an email, a push notification, or an SMS electronic marketing communication;

cause each respective electronic marketing communication to be generated as a treatment in accordance with the assigned level indicative of the one particular time period from among the plurality of particular time periods between the instances of electronic marketing communication and the one promotion level being indicative of the type of promotion;

receive clickstream data comprising a plurality of clickstream events, wherein each clickstream event comprises a tracking cookie associated with the particular consumer recipient;

determine that at least one of the clickstream events is associated with an electronic marketing communication from among the respective electronic marketing communications;

determine that the tracking cookie is associated with the experiment model;

identify a resulting interaction from the particular consumer recipient associated with the at least one of the clickstream events;

associate the resulting interaction with the experiment model; and enable to change script code for exchanging or altering one or more of: the type of experiment, the audience, the set of email cadence factors, or the set of promotion factors based on the association between the resulting interaction with the experiment model.

20. The apparatus of claim 19, wherein the communication service is at least one of a content selection service or a cadence management service.

21. The apparatus of claim 19, further comprising:

result analysis circuitry configured to:

determine a performance characteristic of the at least one level used to generate the electronic marketing communication based at least in part on the at least one clickstream event.

22. The apparatus of claim 21, wherein the result analysis circuitry is further configured to:

determine that a second of the clickstream events is associated with a different electronic marketing communication; and determine a second performance characteristic of a different level associated with the different electronic marketing communication.

23. The apparatus of claim 21, wherein the at least one of the clickstream events is determined to be associated with the electronic marketing communication based at least in part on the at least one clickstream event being associated with a consumer to which the electronic marketing communication was transmitted.

24. The apparatus of claim 21, wherein the at least one of the clickstream events is determined to be associated with the electronic marketing communication based at least in part on the at least one of the clickstream events occurring within a threshold time period of when the electronic marketing communication was transmitted.

25. The apparatus of claim 24, wherein the threshold time period is one week.

26. The apparatus of claim 21, wherein the experiment management circuitry is further configured to provide an application programming interface by which the request is received from the communication service.

27. The apparatus of claim 19, wherein the successful previous treatment indicates one or more of: the particular consumer responded to at least one promotion associated with the previous treatment, the particular consumer purchased a product or service associated with the previous treatment, or the particular consumer shared a particular product or service associated with the previous treatment via social media.

\* \* \* \* \*

UNITED STATES PATENT AND TRADEMARK OFFICE
CERTIFICATE OF CORRECTION

PATENT NO. : 11,170,388 B1
APPLICATION NO. : 15/167108
DATED : November 9, 2021
INVENTOR(S) : James Violette et al.

Page 1 of 1

It is certified that error appears in the above-identified patent and that said Letters Patent is hereby corrected as shown below:

In the Claims

In Column 44, Line 33, Claim 1, delete "AB" and insert -- A/B --, therefor.

In Column 46, Line 29, Claim 10, delete "AB" and insert -- A/B --, therefor.

In Column 48, Line 31, Claim 19, delete "AB" and insert -- A/B --, therefor.

Signed and Sealed this
First Day of November, 2022

Katherine Kelly Vidal
*Director of the United States Patent and Trademark Office*